United States Patent
Nimbalker et al.

(10) Patent No.: US 11,936,479 B2
(45) Date of Patent: *Mar. 19, 2024

(54) FEEDBACK SIGNALING FOR WIRELESS COMMUNICATION

(71) Applicant: Telefonaktiebolaget LM Ericsson (publ), Stockholm (SE)

(72) Inventors: Ajit Nimbalker, Fremont, CA (US); Robert Baldemair, Solna (SE); Qiang Zhang, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,124

(22) Filed: Feb. 8, 2023

(65) Prior Publication Data

US 2023/0188263 A1 Jun. 15, 2023

Related U.S. Application Data

(63) Continuation of application No. 17/240,624, filed on Apr. 26, 2021, now Pat. No. 11,581,979.

(51) Int. Cl.
*H04W 28/06* (2009.01)
*H04L 1/00* (2006.01)
*H04L 1/16* (2023.01)

(52) U.S. Cl.
CPC ............ *H04L 1/16* (2013.01); *H04L 1/004* (2013.01)

(58) Field of Classification Search
CPC ... H04L 5/0055; H04L 1/0061; H04L 5/0046; H04L 1/0067; H04L 1/0072; H04L 1/0013; H04L 1/0041; H04L 1/1864; H04L 5/0057; H04L 1/1861; H04L 1/1893; H04L 1/1671; H04L 1/004; H04L 1/0057; H04L 1/007; H04L 1/0073; H04W 72/0413; H04W 28/06; H03M 13/136; H03M 13/635; H03M 13/356; H03M 13/6525

See application file for complete search history.

(56) References Cited

U.S. PATENT DOCUMENTS

| | | | |
|---|---|---|---|
| 2013/0010690 A1 | 1/2013 | Cheng et al. | |
| 2013/0117622 A1* | 5/2013 | Blankenship | H04L 1/0041 714/751 |
| 2021/0160732 A1* | 5/2021 | Lee | H04L 1/1671 |
| 2021/0266941 A1* | 8/2021 | Park | H04L 5/0053 |

OTHER PUBLICATIONS

International Search Report and Written Opinion dated Jan. 19, 2022 for International Application No. PCT/SE2021/050917 filed Sep. 22, 2021, consisting of 14-pages.
3GPP TSG RAN WG1 Meeting #99 R1-1911947; Title: PUSCH Enhancements for NR URLLC; Agenda Item: 7.2.6.3; Source: Ericsson; Document for: Discussion, Decision; Date and Location: Nov. 18-22, 2019, Reno, USA, consisting of 15-pages.

* cited by examiner

*Primary Examiner* — Jung Liu
(74) *Attorney, Agent, or Firm* — Christopher & Weisberg, P.A.

(57) ABSTRACT

There is disclosed a method of operating a wireless device in a wireless communication network, the method including transmitting feedback signaling including feedback information, the feedback information being encoded with an error coding scheme, wherein an error coding size of the error coding scheme is dependent on a type of the feedback information. The disclosure also pertains to related devices and methods.

20 Claims, 2 Drawing Sheets

FEEDBACK SIGNALING FOR WIRELESS COMMUNICATION

CROSS REFERENCE TO RELATED APPLICATION

This application is a continuation of U.S. application Ser. No. 17/240,624 filed Apr. 26, 2021 entitled "FEEDBACK SIGNALING FOR WIRELESS COMMUNICATION", the entirety of which is incorporated herein by reference.

TECHNICAL FIELD

This disclosure pertains to wireless communication technology, in particular for high frequencies.

BACKGROUND

For future wireless communication systems, use of higher frequencies is considered, which allows large bandwidths to be used for communication. However, use of such higher frequencies brings new problems, for example regarding physical properties and timing. Ubiquitous or almost ubiquitous use of beamforming, with often comparatively small beams, may provide additional complications that need to be addressed. Of specific interest is the process of switching between beams, e.g., due to movement of a user equipment; such beam switching should be quick and only require low signaling overhead, e.g., to avoid noticeable lags or interruption of communication.

SUMMARY

It is an object of this disclosure to provide improved approaches of handling wireless communication, in particular in the context of providing feedback. The approaches are particularly suitable for millimeter wave communication, in particular for radio carrier frequencies around and/or above 52.6 GHz, which may be considered high radio frequencies (high frequency) and/or millimeter waves. The carrier frequency/ies may be between 52.6 and 140 GHz, e.g., with a lower border between 52.6, 55, 60, 71 GHz and/or a higher border between 71, 72, 90, 114, 140 GHz or higher, in particular between 55 and 90 GHz, or between 60 and 72 GHz; however, higher frequencies may be considered. The carrier frequency may in particular refer to a center frequency or maximum frequency of the carrier. The radio nodes and/or network described herein may operate in wideband, e.g., with a carrier bandwidth of 1 GHz or more, or 2 GHz or more, or even larger, e.g., up to 8 GHz; the scheduled or allocated bandwidth may be the carrier bandwidth, or be smaller, e.g., depending on channel and/or procedure. In some cases, operation may be based on an OFDM waveform or a SC-FDM waveform (e.g., downlink and/or uplink), in particular a FDF-SC-FDM-based waveform. However, operation based on a single carrier waveform, e.g., SC-FDE (which may be pulse-shaped or Frequency Domain Filtered, e.g., based on modulation scheme and/or MCS), may be considered for downlink and/or uplink. In general, different waveforms may be used for different communication directions. Communicating using or utilising a carrier and/or beam may correspond to operating using or utilising the carrier and/or beam, and/or may comprise transmitting on the carrier and/or beam and/or receiving on the carrier and/or beam.

The approaches are particularly advantageously implemented in a 5$^{th}$ Generation (5G) telecommunication network or 5G radio access technology or network (RAT/RAN), in particular according to 3GPP (3$^{rd}$ Generation Partnership Project, a standardisation organization). A suitable RAN may in particular be a RAN according to NR, for example release 15 or later, or LTE Evolution. However, the approaches may also be used with other RAT, for example future 5.5G or 6G systems or IEEE based systems.

There is disclosed a method of operating a wireless device or a feedback radio node in a wireless communication network. The method comprises transmitting feedback signaling comprising, and/or representing and/or corresponding to, feedback information, the feedback information being encoded with an error coding scheme, wherein an error coding size of the error coding scheme is dependent on a type of the feedback information.

Moreover, a wireless device or feedback radio node for a wireless communication network is described. The wireless device or feedback radio node is adapted for transmitting feedback signaling comprising, and/or representing and/or corresponding to, feedback information, the feedback information being encoded with an error coding scheme, wherein an error coding size of the error coding scheme is dependent on a type of the feedback information.

A method of operating a network node or signaling radio node in a wireless communication network is considered. The method comprises receiving, from a wireless device or feedback radio node, feedback signaling comprising, and/or representing and/or corresponding to, feedback information, the feedback information being encoded with an error coding scheme, wherein an error coding size of the error coding scheme is dependent on a type of the feedback information.

There is also proposed a network node or signaling radio node for a wireless communication network. The network node or signaling radio node is adapted for receiving, from a wireless device or feedback radio node, feedback signaling comprising, and/or representing and/or corresponding to, feedback information, the feedback information being encoded with an error coding scheme, wherein an error coding size of the error coding scheme is dependent on a type of the feedback information.

The feedback information may be represented or representable or corresponding to a number of bits and/or in a bit field. Feedback information may comprise and/or represent different types of information, e.g., in different bit fields and/or containers. In some cases, feedback information may be of type of a set of types, each type of the set representing a different type. To different types (or to each of the types) of the set, there may be associated different error coding sizes. It may be considered that the set comprises and/or is associated to a number Ntype of information types (e.g., Ntype may be an integer and/or Ntype=2 or more), and/or a number Nsize of error coding sizes (e.g., Nsize may be an integer and/or Nsize=2 or more), Nsize may be equal to Ntype, or smaller (e.g., to allow the same error coding size being associated to a number of elements or types of the set, but not to all of them). The set may comprise individual types and/or combination types. In general, the feedback information may be considered to represent control information, in particular UCI or SCI. The feedback signaling may be transmitted on a control channel or data channel (e.g., PUSCH or PSSCH) or on resources allocated or scheduled for such. A feedback information type may be associated to a transmission trigger; for example, different types of information, e.g., acknowledgement information and/or measurement information, may be associated to different types of trigger, e.g., aperiodic or dynamic scheduling (e.g., triggering one transmission of feedback signaling, or a limited number N (e.g., N<=8 or 4) of transmissions with physical layer signaling, e.g., using a DCI or SCI message and/or a physical control channel like PDCCH or PSCCH, or a MAC layer control element) or semi-static or semi-persistent or periodic, e.g., configured with higher layer signaling like RRC layer signaling or RLC layer signaling, e.g., on a data channel like a PDSCH or PSSCH (a MAC CE may in general be transmitted on a data channel).

The error coding size may be represented or representable by a number of bits, e.g., number of bits representing coding, and/or number of bits added to the information bits to represent coded bits (information bits plus error coding bits according to the error coding scheme, plus optionally one or more additional error coding schemes, e.g., error detection coding plus error correction coding, e.g., CRC and/or Forward Error Coding). Added bit may generally indicate a larger number of bits than the number of information bits; this can be due to appending the coding bits, or by mapping the information bits to a larger number of bits in general. The error coding size alternatively, or additionally, may be represented by and/or correspond to the size or order of a function used to determine the error coding, for example a CRC polynomial size or order and/or polar coding mapping function. A function may be represented or representable by a table or matrix or other expression. An error coding scheme may indicate or represent the error coding used for providing coded bit based on information bits; it may pertain to error detection coding (e.g., CRC) and/or error correction coding (e.g., FEC like LDPC or polar coding). A transmitter (e.g., feedback radio node) may be adapted to use the error coding or error coding scheme to encode bit of the feedback information, and a receiver (e.g., signaling radio node or network node) may be adapted to use the coding or coding scheme for decoding received signaling and/or determining whether it has received the signaling correctly and/or for correction errors in received signaling. Feedback information may be determined, e.g., by the feedback radio node, based on received subject signaling or subject transmission, e.g., reference signaling (e.g., CSI-RS and/or DM-RS and/or synchronisation signaling), and/or data or control signaling, e.g., scheduled or allocated or monitored for reception.

In general, receiving feedback signaling encoded with an error coding scheme and/or based on an error coding size may correspond to decoding the signaling based on the scheme and/or size, e.g., assuming that error coding bits of the size and/or according to the scheme are present in the signaling. In particular, checking whether an error is presented in decoded information, and/or whether decoding was successful, based on error detection coding like a CRC of the assumed size may be performed for decoding and/or receiving. Decoding may be determined to be successful if the check does not determine an error. However, this may be wrong with a certain likelihood, which may depend on the error coding size. For larger error coding sizes (in particular, for error correction coding), this likelihood may be smaller than for smaller error coding sizes.

Approaches described herein facilitate selective increased protection for feedback information, with low signaling overhead. For example, feedback information whose wrong reception may lead to highly consequential wrong behaviour (e.g., beam switch to a wrong beam) may be protected with a larger number of bits (larger size) than less critical information, e.g., measurement information for channel quality reporting, which merely may influence dynamically adaptable and quickly correctable link adaptation. Also, the consequences of wrong acknowledgement feedback may be less critical than some measurement feedback, and/or the consequences of wrong decoding of high priority signaling, e.g., URLLC signaling, may be more detrimental than for lower priority signaling, e.g., eMBB signaling compared to URLCC signaling. With adapting the error coding size to the type of feedback information, the likelihood of wrong decoding of information with larger error coding size is reduced in comparison to information with smaller error coding size; with using different sizes, the signaling and processing overhead may be limited.

In general, one or more types and/or error coding schemes and/or associations between scheme, and/or error coding size, and type of feedback information may be configured or configurable, e.g., with higher layer signaling, like RRC signaling or RLC signaling, and/or it may be predefined.

The feedback information may be part of and/or transmitted as, and/or comprise in a feedback report. The feedback report may be associated to a feedback report identity.

An error coding scheme may correspond to, and/or pertain to, and/or indicate, and/or represent error detection coding and/or error correction coding. Example of error coding schemes may comprise and/or pertain to CRC and/or LDPC (Low Density Parity Coding) and/or polar coding and/or turbo coding and/or Muller-Reed coding. Different error coding sizes may indicate different schemes or feedback information types; for example, different number of FEC bits may indicate different schemes or feedback information types, and/or different numbers of CRC bits may indicate different CRC schemes (e.g., different polynomials or differently sized polynomials) and/or different feedback information types.

In general, feedback signaling may comprise and/or be associated to and/or carry the feedback information and/or the associated error coding bits of the error coding size, e.g., according to the error coding scheme.

Measurement information may be one type of feedback information. It may be considered that different feedback information types are associated and/or pertaining to different types of measurement information. For example, a first type of feedback information and/or first type of measurement information may pertain to received signal strength, e.g., RSRP (Received Signal Receiver Power) or other parameter indictive of signal strength, and/or to a specific type of subject transmission, e.g., reference signaling like CSI-RS or SSB. An example of such may comprise CSI-RSRP (RSRP measured for CSI-RS) or SSB-RSRP (RSRP measured for SSB). A second type of feedback information may pertain to received signal quality, e.g., for CSI-RS or DM-RS or SSB, e.g., representing SINR or SIR or SNR or other parameter indicative of signal quality, and/or indicating one or more beamforming parameters, e.g., a precoder and/or rank (e.g., PMI or RI, Precoding Matrix Indicator or Rank Indicator).

It may be considered that the error coding scheme may be based on, and/or correspond, and/or comprise, and/or pertain to, a Cyclic Redundancy Check. Different types of feedback information may be associated to different error coding sizes, e.g., different CRC sizes or polynomials. A larger CRC size may in general allow better error detection; it is less likely that wrongly decoded information passes a CRC procedure undetected than for a smaller CRC size.

In general, the feedback information may be transmitted in a feedback report. The report may comprise one type of feedback information, e.g., of a first type, and/or with a first error coding size (e.g., out of a set of available error coding sizes, e.g., based on the first type). In some cases, the report may comprise more than one type of feedback information. The error coding scheme and/or error coding size corresponding to one of the types may be used for all of the types in the report, e.g., corresponding to the largest size (largest number of bits of CRC, e.g.), for example in a joint encoding. In some cases, information of different types may be encoded separately. Alternatively, information types to which the same coding scheme or error coding size is associated may be jointly encoded; if different sizes are associated, there may be separate encoding, e.g., separate joint encoding of type/s with the same size and/or scheme. Thus, processing and signaling overhead for the error coding may be balanced and/or optimised.

In some variants, the feedback signaling may comprise different types of feedback information, wherein to different types of feedback information, different error coding sizes may be associated. The different types may be in the same report, or in different reports, e.g., transmitted at different times and/or resources and/or occasions for transmission. Thus, signaling resource use may be optimised and/or adapted to operation conditions.

It may be considered that the type of feedback information may correspond to one of, or a combination of, measurement information and/or acknowledgment information and/or different triggering types and/or resources used for triggering (e.g., different search spaces or CORESETs in which a DCI or SCI scheduling subject transmission and/or associated transmission of feedback information is received may be associated to different types of feedback information, even for feedback information of the same content type, e.g., acknowledgement information or measurement information), and/or one or more subtypes thereof. Subtypes may be associated to different priorities or procedures or content type. For example, subtypes of acknowledgement information may be associated to URLLC or eMBB signaling, and/or different quality of service requirements or types, or different logical channels, for the associated subject transmission, and/or associated to the resources allocated for transmission, and/or the triggering type for the acknowledgement information to be transmitted. Subtypes of measurement information may correspond to measurement information indicating signal strength or signal quality or beam information (e.g., PMI or RI), and/or different types of reference signaling it pertain to (e.g., DM-RS or CSI or SSB), and/or different resources used for triggering or different triggering types.

It may be considered that the feedback signaling may be physical layer signaling and/or the feedback information may be physical layer information and/or the feedback signaling and/or feedback information may represent Uplink Control Information, UCI, or SCI. The signaling may be transmitted on a control channel or associated and/or allocated resources (e.g., configured or scheduled for a control channel like PUCCH or PSCCH), or on a data channel or associated and/or allocated resource (e.g., configured or scheduled for a data channel like PUSCH or PSSCH). Such signaling may be quickly processed and may not be protected by a retransmission scheme itself (e.g., not part of a HARQ or ARQ scheme); good protection (allowing reliable decoding and error detection/correction) may be achieved with low signaling overhead for specific types of information.

In some cases, the error coding size may be a number of bits, e.g., 16 bits or more for a first type of information, and fewer than for the first type of feedback information for a second type of feedback information. For example, the higher number of bits, e.g., 16 bits, or more, of error coding size may be associated to CSI-RSRP measurement information, and fewer, e.g., 11 or fewer, may be associated to other types of measurement information, in particular Channel Quality Information, and/or PMI and/or RI. Alternatively, the higher number of bits, e.g., 16 bits or more, may be associated to acknowledgment information, and/or the higher number of bits, e.g., 16 bits or more, may be associated to URLLC and/or high priority HARQ feedback (e.g., pertaining to high priority or URLLC subject transmission/s), and fewer than that, e.g., 11 or fewer, may be associated to lower priority HARQ feedback or eMBB HARQ feedback (e.g., pertaining to low/er priority or eMBB subject transmission/s). Thus, a larger size may be used for more relevant or critical information, with lower signaling overhead for less relevant or critical information. In particular, wrong retransmissions or new transmission for high priority/URLLC may be avoided to a higher degree, and/or undesirable operation based on CSI-RSRP wrongly decoded may be limited, in particular in the context of beams switching or beam selection; this may in particular avoid time consuming beam realignment or beam recovery procedures. The error coding scheme and/or error coding sizes may in particular pertain to error detection coding, in particular be CRC-based or correspond to CRC.

In general, the type of feedback information may correspond to one of, or a combination of, different types of measurement information, e.g., reporting of signal strength and/or reporting on channel quality (e.g., CQI), and/or different types of acknowledgement information, e.g., associated to different types of scheduling and/or priority and/or quality of service. Thus, good quality of error protection of more critical information may be provided, without increasing all signaling overhead.

It may be considered that the feedback signaling may be transmitted in a beam selection and/or beam switching procedure. In particular, it may be considered that for such a procedure, measurement information (e.g., indicating signal strength like RSRP for one or more beams) may be transmitted with error coding size different from a channel estimation procedure, e.g., with a larger error coding size. Thus, costly undesired beams switching due to erroneous reception of feedback information may be limited.

In general, different types of feedback information, and/or error coding schemes, and/or error coding sizes, may correspond to, and/or may be used in, and/or may be associated to, different types procedures in which the feedback signaling is transmitted. A type of procedure may correspond to, and/or comprise, and/or be represented by, a random access procedure, or a cell search procedure, or a beam selection procedure (or beam switching procedure, e.g., pertaining to different beams or beam pairs), or a channel estimation procedure (e.g., pertaining to one specific beam, and/or providing CQI) or a link adaptation procedure, or a neighbor cell measurement procedure, or a handover procedure, or an acknowledgement signaling process. Each procedure may include transmission of feedback signaling and/or feedback information, which may have different types. It may be considered that for a beam selection procedure, measurement information with a larger error coding size may be transmitted with the feedback signaling than for at least one other procedure in which measurement information is transmitted, e.g., for channel estimation or CQI or a cell search procedure. The coding size may pertain to CRC. Measurement information for different types of procedures may be of, and/or comprise or represent, the same type, or a different type. In particular, the measurement information for a beam selection procedure may pertain (e.g., only pertain to) to signal strength, e.g., CSI-RSRP or SSB-RSRP, whereas channel estimation or CQI may pertain to signal quality. In general, it may be considered that measurement information pertaining to received signal quality may be indicative of received signal strength as well; however, measurement information pertaining to received signal strength may be not indicative of received signal quality.

In general, the network node or signaling radio node may be adapted for, and/or perform communicating based on the received feedback signaling, e.g., a report. Communicating based on the received feedback signaling or report may comprise transmitting new data and/or retransmission of data based on the signaling or report (e.g., based on acknowledgement information), and/or performing beam management based on the signaling or report (e.g., based on measurement information, in particular signal strength measurement information like CSI-RSRP or SSB-RSRP), and/or performing link adaptation based on the signaling or report, e.g., adapting a MCS based on measurement information. Feedback signaling or a feedback report may in general pertain to, and/or be in response to, subject transmission/s; the network node may be adapted for, and/or perform, transmitting the subject transmission/s, and/or schedule or configure such and/or allocated corresponding resources to the feedback radio node or WD (wireless device). Subject transmission may in general comprise and/or consist of and/or correspond to signaling based on which feedback like UCI or SCI is determined and/or pertains to; for example, subject transmission may comprise data signaling (for example on a PDSCH or PSSCH; and/or associated to a HARQ process), and/or control signaling (e.g., DCI and/or one PDCCH and/or PSCCH), and/or reference signaling (e.g., CSI-RS and/or DM-RS and/or SSB signaling), based on which measurement information or a measurement report may be determined and/or on which measurement may be performed. Subject transmission and/or the feedback report may be configured and/or semi-static and/or periodic (e.g., for periodic measurement reporting). In some variants, the subject transmission and/or feedback report may be scheduled and/or triggered and/or indicated with physical layer control signaling like DCI or SCI and/or on PDCCH or PSCCH), e.g., for dynamic acknowledgment or HARQ feedback and/or aperiodic or dynamic measurement reporting; approaches described herein facilitate efficient referencing in particular in such cases.

A feedback report may be out of a set of feedback reports; the set may comprise one, or a plurality of feedback reports, each of which may be associated to different feedback report identities. The reports of a set may be associated to the same or different types of feedback. There may be considered multiple sets, wherein different sets may pertain to different types of feedback. A set and/or identity may pertain to a time interval and/or for a number of report occurrences, after which it may be repeated and/or restarted. A time interval may in particular be a frame or half-frame, or shorter, and/or correspond to a TDD period (e.g., for DL), or a sequence of more than one TDD periods, e.g., between two UL periods. A TDD period may in general correspond to a period for UL, or DL, or a flexible period (e.g., allowing either UL or DL). A TDD period may in general comprise a number TDDN of allocation units and/or symbols, e.g., predefined or configured or configurable. TDDN may be 50 or larger, or 100 or larger; in some cases, different TDD periods may have the same TDDN; in other cases, TDDN may differ between different periods or period types (UL, DL or flexible).

A feedback report may be of, and/or associated to, a type of feedback and/or feedback information and/or report type, or a combination of two or more different types. Example types of feedback may correspond to acknowledgement feedback, or measurement feedback, or a scheduling request or buffer status report; in some cases, a type may correspond to a specific type of acknowledgement feedback, e.g., to a specific codebook or codebook type, or priority, and/or to dynamic feedback (e.g., based on dynamic scheduling and/or a dynamic HARQ or acknowledgement codebook) or semi-static feedback (e.g., based on a semi-static HARQ or acknowledgement codebook), or aperiodic measurement reporting (e.g., triggered for one or a predefined number of instances with control signaling like DCI or SCI and/or on PDCCH or PSSCH), or periodic measurement reporting (e.g., configured with higher layer signaling, e.g., RRC signaling), or reporting of a buffer status (e.g., BSR, in particular short or long BSR, and/or triggered or scheduled dynamically).

Approaches described herein facilitate improved handling of feedback reports; by associating a feedback report identity to an individual report, communication may efficiently, e.g., with low overhead in signaling and/or processing, refer to and/or react on such a report.

A feedback report or feedback signaling may correspond to and/or represented by a feedback message. A report or message may correspond to one transmission occasion or instance, e.g., in one resource or resource structure, which may be continuous in time and/or frequency domain, physically or virtually. A report may pertain to a plurality of information pieces, e.g., pertaining to multiple processes, e.g., acknowledgement information processes, and/or measurements of multiple parameters and/or multiple measurement objects, e.g., beams. In general, a feedback report or feedback message may comprise and/or indicate one or more entries and/or a plurality of elements. An entry may in some cases represent a pattern or subpattern of acknowledgement information.

It may be considered that the feedback report identity corresponds to a feedback report number and/or counter, and/or a feedback message number and/or counter. Alternatively, or additionally, it may correspond to a process identity, and/or a RNTI (Radio Network Temporary Identifier) and/or be associated to a identifying scrambling of a CRC and/or message and/or a transmission identity, e.g., a signaling characteristic associated to transmission of the feedback report and/or feedback signaling. A number or counter may be represented and/or indicated by an indication in control signaling or in a feedback report, e.g., a feedback report trigger indication or a feedback report indication.

The feedback report may correspond to physical layer signaling, and/or be implemented a physical layer signaling, e.g., as UCI or SCI, and/or on a physical channel like a control channel like PUCCH or PSSCH, or a data channel like PUSCH or PSSCH. Signaling on this layer typically pertains to short timescales for processing; approaches described herein facilitate supporting such short timescales without extensive signaling overhead. In some cases, the report may correspond to MAC layer signaling, e.g., as a MAC control element (CE) or information element (IE).

A feedback report identity being associated to a feedback report may pertain to the feedback report being unambiguously or reliably mappable to the feedback report identity or vice versa; this in particular may pertain to a relevant timescale, e.g., a TDD uplink period or TDD switching period, or a subframe, or between configured or configurable or scheduled events (e.g., a response based on one or more reports). The mapping may be considered reliable if an identity may be identified based on a modulo operation (e.g., modulo N, with N>=4), e.g., performed on an feedback report indication, e.g., a counter value. Such mapping may limit signaling overhead. A feedback report identity may in general be signaled and/or represented or representable, e.g., with signaling, e.g., in the form of a feedback report indication and/or a feedback report trigger indication.

It may be considered that the feedback report or feedback message may comprise a feedback report indication, the feedback report indication indicating the feedback report identity. The indication may be represented in a bit field and/or header; the header may comprise one or more additional bit fields, e.g., indicating a report size and/or type/s of information included in the report, e.g., according to one or more feedback types. The feedback report indication may be transmitted by the In particular, the feedback report may comprise, and/or consist of and/or represent, acknowledgement information, e.g., mixed with other feedback, or solely acknowledgement information of one or more different types. Such reports may be transmitted quite often, and reference to different reports and/or entries therein may be efficiently and unambiguously provided. In particular, for high frequency networks, large numbers of HARQ processes may be implemented, with dynamic adaption of HARQ feedback; approaches described herein facilitate efficient reference to such reporting and/or efficient transmission and retransmission.

Alternatively, or additionally, the feedback report may comprise measurement information. For example, the feedback report may be considered a measurement report, and/or comprise such. The measurement report may be aperiodic and/or dynamically scheduled.

It may be considered that the feedback report may be based on control signaling indicating the feedback report identity. The control signaling may indicated and/or represent and/or comprise a feedback report trigger indication. The control signaling may schedule, and/or trigger, and/or allocate resources for, the feedback report and/or transmission of the feedback report. In some cases, the control signaling may be physical layer control signaling, e.g., in a DCI message or SCI message, and/or on a physical control channel like PDCCH or PSCCH. The feedback report trigger indication in general may indicate the feedback report identity, e.g., explicitly or implicitly. It may indicate the identity of a feedback report it triggers, or is triggered by the control signaling or control information message, which may include the feedback report trigger indication. The feedback report trigger indication may be associated to triggering and/or scheduling and/or allocating the transmission of the feedback report and/or be transmitted by a network node or a signaling radio node.

It may be considered that a size of the feedback report may be associated with the feedback report identity. The size may be indicated in the feedback report, and/or configured or indicated to the wireless device or feedback radio node with control signaling.

Alternatively, or additionally, the method of operating a wireless device in a wireless communication network may comprise performing a beam selection update. The beam selection update may be based on received control signaling, the control signaling comprising a report indication indicating a measurement report transmitted by the wireless device. The control signaling further may comprise an element indication, the element indication indicating an entry of the indicated measurement report.

Alternatively, or additionally, the wireless device for a wireless communication network may be adapted for performing a beam selection update, the beam selection update being based on received control signaling. The control signaling may comprise a report indication indicating a measurement report transmitted by the wireless device, wherein the control signaling further may comprise an element indication, the element indication indicating an entry of the indicated measurement report.

Alternatively, or additionally, the method of operating a network node in a wireless communication network may comprise receiving a measurement report from a wireless device. The method may further comprise transmitting control signaling to the wireless device, the control signaling comprising a report indication indicating a measurement report received from the wireless device. The control signaling further may comprise an element indication, the element indication indicating an entry of the indicated measurement report, the control signaling triggering a beam selection update performed by the wireless device.

Moreover, a network node for a wireless communication network is proposed. The network node may be adapted for receiving a measurement report from a wireless device. The network node may further be adapted for transmitting control signaling to the wireless device, the control signaling comprising a report indication indicating a measurement report received from the wireless device, wherein the control signaling further may comprise an element indication. The element indication may indicate an entry of the indicated measurement report, the control signaling adapted for triggering a beam selection update performed by the wireless device.

An element of a measurement report may correspond to an entry, e.g., a row and/or column of a measurement report and/or a table or list provided in the report. The report in general may comprise an ordered list of entries or elements. The measurement report indication may refer or indicate a measurement report ID. The measurement report may be considered an example of a feedback report.

It may be considered that the measurement report may comprise a plurality of entries. Each entry may comprise a beam indication or reference indication, e.g., indicating a beam or beam pair or reference signaling, which may be associated to a beam, e.g., a reference beam or signaling beam. The beam indication or reference indication may indicate to which reference signaling or beam a measurement result associated to the indication may pertain to.

The measurement report may comprise a plurality of entries, wherein each entry may comprise a measurement result, or an indication of a measurement result, or a set of measurement results, or a set of indications of measurement results, which may pertain to received reference signaling. Each entry may also comprise a beam indication or reference indication, e.g., indicating the reference signaling or beam measured on.

In some variants, the element indication may be a pointer to an entry or element of the measurement report. An element may be associated to an entry, e.g., a measurement result or a measurement result indication or a beam indication or reference indication. The element indication may be represented by a bit field having a plurality of bits, e.g., configured or predefined such that it may indicate at least any one entry or element of the measurement report. The size of the measurement report may be configured to the wireless device or feedback radio node, e.g., with RRC layer signaling, e.g., by the network node. The element indication may represent a number of the entry or row or elements.

The measurement report indication may be a pointer to the measurement report. The indication may be implemented as bit field comprising a plurality of bits, e.g., large enough to address or identify the measurement report. The size of the bit field may be configured or predefined, e.g., configured to the wireless device or feedback radio node, e.g., with RRC layer signaling, e.g., by the network node.

The control signaling comprising the measurement report indication and/or element indication may be physical layer signaling or Radio Resource layer signaling.

In general, the wireless device and/or network node may operate in, and/or the communication and/or signaling may be in, TDD operation. It should be noted that the transmission of signaling from transmission sources may be synchronised and simultaneous; a shift in time may occur due to different propagation times, e.g., due to different beams and/or source locations.

A wireless device and/or feedback radio node (a wireless device may be considered an example for a feedback radio node), may in general comprise, and/or be adapted to utilise, processing circuitry and/or radio circuitry, in particular a transmitter and/or transceiver and/o receiver, to process (e.g., trigger and/or schedule) and/or transmit and/or receive signaling like data signaling and/or control signaling and/or reference signaling, and/or to perform beam switching. A wireless device or feedback radio node may be implemented as terminal or UE; in some cases, it may however be implemented as network node, in particular a base station or relay node or IAB node, in particular to provide MT (Mobile Termination) functionality for such. In general, a wireless device of feedback radio node may comprise and/or be adapted for transmission or reception diversity, and/or may be connected or connectable to, and/or comprise, antenna circuitry, and/or two or more independently operable or controllable antenna arrays or arrangements, and/or transmitter circuitries and/or antenna circuitries, and/or may be adapted to use (e.g., simultaneously) a plurality of antenna ports, e.g., controlling transmission or reception using the antenna array/s, and/or to utilise and/or operate and/or control two or more transmission sources, to which it may be connected or connectable, or which it may comprise. The feedback radio node may comprise multiple components and/or transmitters and/or transmission sources and/or TRPs (and/or be connected or connectable thereto) and/or be adapted to control transmission and/or reception from such. Any combination of units and/or devices able to control transmission on an air interface and/or in radio as described herein may be considered a transmitting radio node.

A signaling radio node and/or network node (a network node may be considered an example of a signaling radio node) may comprise, and/or be adapted to utilise, processing circuitry and/or radio circuitry, in particular a receiver and/or transmitter and/or transceiver, to transmit and/or to process and/or receive (e.g., receive and/or demodulate and/or decode and/or perform blind detection and/or schedule or trigger) data signaling and/or control signaling and/or reference signaling, in particular first signaling and second signaling. In some cases, a signaling radio node may be a network node or base station or TRP, or may be an IAB node or relay node, e.g., providing control level functionality for such, e.g., DU and/or CU functionality. In some cases, e.g., sidelink scenarios, a signaling radio node may be implemented as a wireless device or terminal or UE. A signaling radio node or network node may comprise one or more independently operable or controllable receiving circuitries and/or antenna circuitries and/or may be adapted to utilise and/or operate to receive from one or more transmission source simultaneously and/or separately (in time domain), and/or to operate using (e.g., receiving) two or more antenna ports simultaneously, and/or may be connected and/or connectable and/or comprise multiple independently operable or controllable antennas or antenna arrays or subarrays.

Receiving may comprise scanning a frequency range (e.g., a carrier) for reference signaling and/or control signaling, e.g., at specific (e.g., predefined and/or configured) locations in time/frequency domain, which may be dependent on the carrier and/or system bandwidth. Such location/s may correspond to one or more locations or resource allocations configured or indicated or scheduled or allocated to a feedback radio node, e.g., scheduled dynamically, or configured, e.g., with DCI and/or RRC signaling, e.g., for transmission or reception on resources allocated for data signaling.

An allocation unit may be considered to be associated to control signaling if it carries at least a component of the control signaling (e.g., a component of control signaling is transmitted on the allocation unit). In particular, an allocation unit may be considered to be associated to a control channel or data channel if it carries one or more bits of the channel and/or associated error coding, and/or such is transmitted in the allocation unit. An allocation unit may in particular represent a time interval, e.g., a block symbol or the duration of a SC-FDM symbol, or OFDM symbol or equivalent, and/or may be based on the numerology used for the synchronisation signaling, and/or may represent a predefined time interval. The duration (in time domain) of an allocation unit may be associated to a bandwidth in frequency domain, e.g., a subcarrier spacing or equivalent, e.g., a minimum usable bandwidth and/or a bandwidth allocation unit. It may be considered that signaling spanning an allocation unit corresponds to the allocation unit (time interval) carrying the signaling and/or signaling being transmitted (or received) in the allocation unit. Transmission of signaling and reception of signaling may be related in time by a path travel delay the signaling requires to travel from the transmitter to receiver (it may be assumed that the general arrangement in time is constant, with path delay/multi path effects having limited effect on the general arrangement of signaling in time domain). Allocation units associated to different control signalings, e.g., first control signaling and second control signaling, may be considered to be associated to each other and/or correspond to each other if they correspond to the same number of allocation unit within a control transmission time interval, and/or if they are synchronised to each other and/or are simultaneous, e.g., in two simultaneous transmissions. Similar reasoning may pertain to a control transmission time interval; the same interval for two signalings may be the intervals having the same number and/or relative location in the frame or timing structure associated to each signaling.

In some cases, to one or more beams or signals or signalings may be associated a Quasi-CoLocation (QCL) characteristic or set of characteristics, or QCL class (also referred to as QCL type) or QCL identity; beams or signal or signalings sharing such may be considered to be Quasi-Colocated. Quasi-Colocated beams or signals or signalings may be considered (e.g., by a receiver) as the same beam or originating from the same transmitter or transmission source, at least in regard to the QCL characteristic or set or class or identity, and/or to share the characteristic/s. QCL characteristics may pertain to propagation of signaling, and/or one or more delay characteristics, and/or pathloss, and/or signal quality, and/or signal strength, and/or beam direction, and/or beam shape (in particular, angle or area, e.g., area of coverage), and/or Doppler shift, and/or Doppler spread, and/or delay spread, and/or time synchronisation, and/or frequency synchronisation, and/or one or more other parameters, e.g., pertaining to a propagation channel and/or spatial RX parameter/s (which may refer to reception beam and/or transmission beam, e.g., shape or coverage or direction). A QCL characteristic may pertain to a specific channel (e.g., physical layer channel like a control channel or data channel) and/or reference signaling type and/or antenna port. Different QCL classes or types may pertain to different QCL characteristics or sets of characteristics; a QCL class may define and/or pertain to one or more criteria and/or thresholds and/or ranges for one or more QCL characteristics beams have to fulfill to be considered Quasi-Colocated according to this class; a QCL identity may refer to and/or represent all beams being quasi-colocated, according to a QCL class. Different classes may pertain to one or more of the same characteristics (e.g., different classes may have different criteria and/or thresholds and/or ranges for one or more characteristics) and/or to different characteristics. A QCL indication may be seen as a form of beam indication, e.g., pertaining to all beams belonging to one QCL class and/or QCL identity and/or quasi-colocated beams. A QCL identity may be indicated by a QCL indication. In some cases, a beam, and/or a beam indication, may be considered to refer and/or represent a to a QCL identity, and/or to represent quasi-colocated beams or signals or signalings.

Transmission on multiple layers (multi-layer transmission) may refer to transmission of communication signaling and/or reference signaling simultaneously in one or more beams and/or using a plurality of transmission sources, e.g., controlled by one network node or one wireless device. The layers may refer to layers of transmission; a layer may be considered to represent one data or signaling stream. Different layers may carry different data and/or data streams, e.g., to increase data throughput. In some cases, the same data or data stream may be transported on different layers, e.g., to increase reliability. Multi-layer transmission may provide diversity, e.g., transmission diversity and/or spatial diversity. It may be considered that multi-layer transmission comprises 2, or more than 2 layers; the number of layers of transmission may be represented by a rank or rank indication.

Determining on or more reception beams may comprise performing measurement/s on one or more reference signaling beams, in particular beams carrying synchronisation signaling like a SS/PBCH block and/or primary synchronisation signaling and/or secondary synchronisation signaling and/or broadcast signaling and/or pilot signaling. Different reference signaling beams may be transmitted (e.g., by the second radio node) and/or measured (e.g., by the first radio node) at different times; for example, at different time occasions for SS/PBCH block signaling, different beams carrying SS/PBCH block signaling may be transmitted. Determining a reception beam may comprise using different reception beams for receiving the reference signaling beam/s, and/or determining a preferred or best reception beam for the reference signaling beam and/or for a plurality of such beams. A preferred or best reception beam may be a beam having highest signal quality and/or signal strength, in particular RSRP (received signal received power) or power density or similar. A reception beam may be associated to the reference signaling beam, e.g., defining a beam pair. Determining the reception beam/s may comprise transmitting a measurement report (in particular, a first measurement report), e.g., to the second radio node, which may indicate at least one best or preferred reference signaling beam, e.g., based on the best signal quality or strength determined for the reference signaling beam with the best or determined reception beam, and/or may indicate the signal strength and/or signal quality associated to a reference signaling beam and/or a beam pair comprising the reference signaling beam (it should be noted that the network node does not necessarily need to know which reception beam a radio node uses to receive e.g., a reference signaling beam like a beam carrying SS/PBCH, as long as it knows which reference signaling beam has the best quality and/or strength at the receiver).

Performing beam switching to a beam may in general comprise utilising the beam for transmission and/or reception and/or communication, e.g., from using a different beam, or in some cases, staying at the beam. Transmission may in particular be transmission of reference signaling (e.g., CSI-RS) and/or data signaling and/or control signaling; reception may in particular pertain to receiving and/or measuring reference signaling like CSI-RS and/or receiving data signaling and/or control signaling. Performing beam switching may also be referred to as performing a beam selection update. Beam switching and/or beam selection update may pertain to a transmission beam (e.g., for uplink transmission) and/or reception beam, or beam pair, e.g., for using a reception beam for reception of a downlink transmission beam).

The wireless device (also referred to as first radio node) may in general comprise processing circuitry and/or radio circuitry, in particular a receiver and/or transceiver and/or transmitter, for performing measurement and/or control beam switch and/or control beamforming and/or receive and/or transmit signaling. The wireless device may in particular be implemented as terminal or a user equipment. However, in some cases, e.g., relay and/or backlink and/or IAB scenarios, it may be implemented as network node or network radio node.

Reference signaling beams may be first reference signaling beams. The reference signaling may be broadcast signaling and/or non-target specific signaling and/or cell-wide signaling. The total set may cover (e.g., essentially) a cell spatial extension and/or a sector spatial extension and/or may be substantially isotropic, e.g., in 2 or 3 dimensions.

There may in general be a defined and/or configured a set of reference signaling beams, which may be transmitted periodically, e.g., utilising beam switching and/or beam sweeping. A target reference beam may be a beam to be aimed at the first radio node, and/or to which corresponding beams for transmission and/or reception may be associated. A beam associated to the target reference beam may be a beam that has a spatial angle smaller than the target reference beam, but included therein at least partly, and/or having the same direction (e.g., direction of the main lobe), and/or representing a partial beam of the target reference beam. A target reception beam or a reception beam may be associated to a target reference beam, e.g., to form a beam pair. In general, a target reception beam or a preferred or best beam may be a beam with the best and/or preferred signal quality and/or signal strength, in some cases considering additional parameters, e.g., a delay characteristic. In particular, a target reception beam or preferred or best beam may be based on signal strength and/or signal quality and/or delay characteristic condition/s. In some cases, a target reception beam may be associated to one of the reception beams, e.g., the preferred or best reception beam; for example, a target reception beam may represent a partial beam of one of the reception beams (e.g., part of the spatial angle and/or angular distribution) and/or may be smaller than the reception beam, and/or at least partially overlap with it and/or be included therein. A set of reception beams may be defined and/or configured or configurable, and/or usable by a radio node, e.g., based on information in memory. A radio node may in general comprise and/or be connected or connectable to an antenna arrangement allowing beam forming.

A network node, which also may be referred to as signaling radio node or second radio node, may in general comprise processing circuitry and/or radio circuitry, in particular a receiver and/or transceiver and/or transmitter, for transmitting reference signaling and/or a beam switch indication and/or for beam switching and/or control beam switch and/or control beamforming and/or receive and/or transmit signaling. The second radio node may in particular be implemented as a network node, e.g., a network radio node and/or base station or a relay node or IAB node. However, in some cases, e.g., sidelink scenarios, the second radio node may be implemented as a wireless device or terminal, e.g., a user equipment.

Control signaling by a network node comprising the measurement report indication and the element indication may in general be considered an example of a beam switch indication, A beam switch indication may explicitly or implicitly indicate to switch to a reception beam associated to the target reference beam and/or a target reception beam and/or a transmission beam, associated to the target reception beam. The beam switch indication may in particular be transmitted utilising physical layer signaling, e.g., a downlink control information message. The beam switch indication may indicate a measurement to be performed, e.g., on a radio node specific reference signaling, e.g., CSI-RS or T-RS or similar.

The approaches herein allow fast beam switch, with low overhead. In particular, a first radio node like a wireless device or feedback radio node may identify a preferred reception beam (target reception beam), and use this or an associated beam for further communication. The small timescales associated to high frequencies and/or bandwidths (e.g., for symbol time intervals or equivalent) may be accommodated for, as beam switching may be performed quickly.

It may be considered that the (first) reference signaling may be and/or may comprise synchronisation signaling, in particular SS/PBCH block signaling, or cell-identification signaling or broadcast signaling. Such signaling allows determination of target reception beams for different scenarios and/or different beams and signaling path environments, e.g., adapting to unpredictable beam behaviour (e.g., in situations without line-of-sight connection).

It may be considered that the beam switch indication may be represented by control signaling, e.g., physical layer signaling and/or a control information message, e.g., a DCI message or SCI message. This allows quick handling of the signaling, without having to involve higher layers, which could extend the time needed to react to the signaling.

In some variants, the beam switch indication (and/or the message it is included in) may comprise, and/or may be represented by, a measurement triggering indication. The measurement triggering indication may schedule further (generally also referred to second) reference signaling, e.g., signaling specifically targeted at the first radio node (e.g. UE specific signaling), like CSI-RS and/or T-RS and/or PT-RS (or in some instances, SRS; e.g., in a sidelink scenario).

It may be considered that performing beam switch to the target reception beam and/or a beam associated thereto is based on performing measurements on further and/or second reference signaling. Performing measurements may comprise transmitting a measurement report to the network, e.g., a second radio node, which may for example indicate acknowledgement of the beam switch and/or indicate whether the beam is suitable and/or beam switch will be performed (e.g., based on whether a channel estimate and/or signal quality and/or signal strength and/to delay characteristic reaches a threshold or not). Accordingly, the target link and/or beam pair may be tested before switching. The measurement may be performed with the preferred or best beam of the reception beams, and/or with the target reception beam. The second reference signaling may be transmitted on a target reference beam, and/or with one or more partial beams and/or beam associated thereto. It may be considered that the measurement is performed with multiple beams associated to the target reception beam and/or to the best or preferred reception beam. The length and/or number of second reference signaling/s may be adapted accordingly, e.g., to accommodate switching between the reception beams and/or transmission beams used. Thus, a (narrower than the originally determined best or preferred) reception beam and/or transmission beam (or associated beam pair) may be determined.

In general, performing beam switch to the target reception beam may comprise using and/or applying the target reception beam for reception and/or using a transmission beam associated to the target reception beam for transmission. Thus, follow-up transmissions and/or receptions may benefit from beamforming gain.

In some cases, the beam switch indication may trigger measurement on second reference signaling. This allows signaling with low overhead. Parameters and/or resources for the measurement and/or second reference signaling may be configured or configurable, e.g., with higher-layer signaling like RRC or MAC signaling.

It may be considered that the beam switch indication is included in a control information message, e.g., a control information message triggering a measurement, e.g., on reference signaling and/or second reference signaling. The beam switch indication may be implicit, e.g., represented by a bit field indicating and/or scheduling the measurement, and/or explicit, e.g., in a separate bit field (a bit field may comprise one or more bits).

There is also described a program product comprising instructions causing processing circuitry to control and/or perform a method as described herein. Moreover, a carrier medium arrangement carrying and/or storing a program product as described herein is considered. An information system comprising, and/or connected or connectable, to a radio node is also disclosed.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
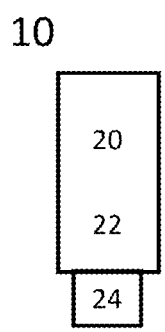
FIG. 1, showing an exemplary (e.g., feedback) radio node.

An exemplary beam switching (or beams status update or beam selection procedure) scenario may be considered. Actions indicated as SUn may be considered to be performed by a first radio node 10 like a UE. Actions indicated as SNn may be considered to be performed by a second radio node 100 like a network node or an arrangement of network nodes. In an optional action SN10, a measurement of first reference signaling may be triggered with a suitable message, e.g., a higher layer message configuring such, or and/or with physical layer control signaling. The first reference signaling may in particular be SS/PBCH block or (or SSB) signaling, which may be transmitted periodically with different reference signaling beams (e.g., every n ms). Such signaling may generally identify a cell and/or transmission source, e.g., indicate a physical ID. The measurement may in particular be a signal strength measurement, e.g., measuring RSRP. In actions SU12 and SU14, which may be performed separately or combined, measurements are performed; the first radio node may determine (which may comprise storing), for one or more, e.g., each received, or each, or for the N best/strongest, reference signaling beams (different SSB beams) a preferred reception beam and/or the associated measurement (or an indication thereof); other beam characteristics may be utilised to determine the best beam, e.g., delay characteristic/s. In action SU16, a corresponding measurement report (first measurement report, e.g., an example of a feedback report) may be transmitted to the network and/or second radio node 100. In action SN18, the second radio node may receive the report and determine for itself a best or target reference beam (based on the same criteria as the first radio node). In action SN20, the second radio node may transmit or trigger a second measurement on second measurement signaling, in particular CSI-RS signaling or other kind of target specific reference signaling, which may be transmitted in an action SN22 associated to action SN20, e.g., using the target reference beam (the best SSB beam) and/or one or more transmission associated thereto. Alternatively, or additionally, the second radio node may indicate to the first radio node which beam to use, e.g., by referring to the measurement report (e.g., its identity). In action SU 24 (assuming correct reception of the second measurement trigger), the first radio node may perform the measurement, e.g., with the best reception beam associated to the best SSB (in the beam pair) and/or with one or more reception beams associated thereto. Based on the measurements, the first radio node in actions SU26*a* and SU26*b* may transmit a (second) measurement report and/or may perform a beam switch to the target/best reception beam and/or to one of the beam associated to the best or preferred reception beam. Alternatively, or additionally, it may switch to a corresponding or associated transmission beam. The switch or switches (and/or transmission of the report) may be conditional on the measurement indicating a sufficiently good channel quality (e.g., for signal quality and/or delay characteristic). In some cases, a report may be transmitted even if the channel is not good enough, representing a non-acknowledgement to the network (such that the network may positively be informed about the beam switch not being performed). However, in some cases the report may only be transmitted if the channel is sufficient. In action SN28, the second radio node may perform a beam switch to a transmission and/or reception beam associated to the SSB or target reference beam, e.g., based on the report. The second measurement report may generally indicate one or more beams and/or beam pairs and/or associated beam characteristics, e.g., signal quality and/or strength and/or delay characteristic/s and/or beam identity, e.g., for the best and/or target beam/s or beam pair and/or a number of N best and/or for all beams, in particular if multiple transmission beams are used.

In an exemplary scenario, a UE or wireless device may transmit a measurement report to a network node. The measurement report may be based on measurements performed on a plurality of beams, e.g., during beam sweeping. In particular the measurement report may represent measurements performed of reference signaling carried on one or more beams, e.g., CSI-RS or synchronisation signaling. The beams may be reference beams, or signaling beams. The measurement report may pertain to reception beams used for receiving signaling (e.g., for measuring one transmission beam) and/or to one or more transmission beams. The measurement report may comprise a number of entries. Each entry may represent or indicate a beam or beam pair and an associated measurement result (or set of results). For example, a beam or beam pair may be represented by an identification, in particular a RSID. An RSID may be a Reference Signaling ID, which may for example represent the reference signaling measured on, and/or the beam or beam pair. In beamforming systems with large numbers of antennas, and/or a large number of beams, such RSID or other identification may be quite large in terms of bit size, e.g., comprise 15+bits. Based on the measurement results provided in the measurement report, the network node may determine a beam or beam pair (based on the identification) for further use. The network node may transmit control signaling to the wireless device indicating which beam or beam pair to use; e.g., referencing the measurement report identity. Instead of using the identification of the selected beam or beam pair (according to the entry in the report, for example), there might be provided a measurement report indication and an element indication, which may point to the specific report and an entry therein, and/or may point to a beam identification in the entry.

For example, a wireless device may transmit a measurement report with ID j. The measurement report may contain a number n of entries, e.g.; RSID_1-RSRP1; . . . ; RSID_n-RSRPn. Each entry may comprise a beam or reference indication (RSID_x) and a measurement result pertaining to the beam or reference indication. The measurement result may indicate a signal strength and/or signal quality and/or delay characteristic, e.g., measured on reference signaling representing and/or associated to and/or carried on a beam like a reference beam or signaling beam. The control signaling may comprise, as measurement report indication for example a pointer to the report, e.g., a report ID, and as element indication a pointer k, which may point into the measurement report, and/or indicate an entry, e.g., a number of an entry or row or number or element in the report. The wireless device (WD) may transmit a form of acknowledgement, e.g., implicitly or explicitly, for example a control information message or perform random access utilising the beam or beam pair indicated by the received control signaling.

Based on the control signaling, the WD or UE may perform a beam selection update (or a QCL update), and/or may perform an aperiodic measurement based on signaling or a beam, e.g., assuming QCL, for example triggering a beam sweeping procedure. Alternatively, or additionally, a QCL assumption and/or beam may be used for an UL transmission, e.g., assuming reciprocity and/or association between a reception beam and a transmission beam and/or between communication directions, which may in particular be justified for TDD operation on the same frequency bandwidth and/or on short timescales (e.g., subframe of 1 ms or shorter). Performing a beam selection update may be considered performing a beam selection procedure.

In another example, e first radio node, e.g., a wireless device or feedback radio node, may be scheduled or configured to transmit feedback reports, in particular HARQ feedback, at multiple occurrences. In some cases, no feedback may be received by the network node, for example due to not being transmitted (e.g., due to missed scheduling information, or failed Listen-Before-Talk in a license-exempt spectrum), or not being successfully received, e.g., due to interference or beam misalignment). The receiver of the feedback report and/or the transmitter may use a running counter of feedback reports, and/or an explicit indication (like a feedback report trigger indication, or a feedback report indication) to manage the reports, e.g., detecting missing report/s and/or referencing a report with control signaling, e.g., for beam switching and/or to indicate retransmission of a report, or new transmission or retransmission of data signaling based on the report.

FIG. 1 schematically shows a (e.g., first) radio node, in particular a wireless device or terminal 10 or a UE (User Equipment). Radio node 10 comprises processing circuitry (which may also be referred to as control circuitry) 20, which may comprise a controller connected to a memory. Any module of the radio node 10, e.g., a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g., a RAN as described herein, and/or for sidelink communication (which may be within coverage of the cellular network, or out of coverage; and/or may be considered non-cellular communication and/or be associated to a non-cellular wireless communication network). Radio node 10 may generally be adapted to carry out any of the methods of operating a radio node like terminal or UE disclosed herein; in particular, it may comprise corresponding circuitry, e.g., processing circuitry, and/or modules, e.g., software modules. It may be considered that the radio node 10 comprises, and/or is connected or connectable, to a power supply.

Figure 2:
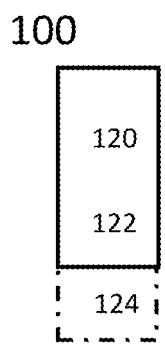
FIG. 2, showing another exemplary (e.g., signaling) radio node.

FIG. 2 schematically shows a (e.g., second) radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g., transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g., processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g., processing circuitry, and/or modules. The radio node 100 may generally comprise communication circuitry, e.g., for communication with another network node, like a radio node, and/or with a core network and/or an internet or local net, in particular with an information system, which may provide information and/or data to be transmitted to a user equipment.

In general, a block symbol may represent and/or correspond to an extension in time domain, e.g., a time interval. A block symbol duration (the length of the time interval) may correspond to the duration of an OFDM symbol or a corresponding duration, and/or may be based and/or defined by a subcarrier spacing used (e.g., based on the numerology) or equivalent, and/or may correspond to the duration of a modulation symbol (e.g., for OFDM or similar frequency domain multiplexed types of signaling). It may be considered that a block symbol comprises a plurality of modulation symbols, e.g., based on a subcarrier spacing and/or numerology or equivalent, in particular for time domain multiplexed types (on the symbol level for a single transmitter) of signaling like single-carrier based signaling, e.g., SC-FDE or SC-FDMA (in particular, FDF-SC-FDMA or pulse-shaped SC-FDMA). The number of symbols may be based on and/or defined by the number of subcarrier to be DFTS-spread (for SC-FDMA) and/or be based on a number of FFT samples, e.g., for spreading and/or mapping, and/or equivalent, and/or may be predefined and/or configured or configurable. A block symbol in this context may comprise and/or contain a plurality of individual modulation symbols, which may be for example 1000 or more, or 3000 or more, or 3300 or more. The number of modulation symbols in a block symbol may be based and/or be dependent on a bandwidth scheduled for transmission of signaling in the block symbol. A block symbol and/or a number of block symbols (an integer smaller than 20, e.g., equal to or smaller than 14 or 7 or 4 or 2 or a flexible number) may be a unit (e.g., allocation unit) used for scheduling and/or allocation of resources, in particular in time domain. To a block symbol (e.g., scheduled or allocated) and/or block symbol group and/or allocation unit, there may be associated a frequency range and/or frequency domain allocation and/or bandwidth allocated for transmission.

An allocation unit, and/or a block symbol, may be associated to a specific (e.g., physical) channel and/or specific type of signaling, for example reference signaling. In some cases, there may be a block symbol associated to a channel that also is associated to a form of reference signaling and/or pilot signaling and/or tracking signaling associated to the channel, for example for timing purposes and/or decoding purposes (such signaling may comprise a low number of modulation symbols and/or resource elements of a block symbol, e.g., less than 10% or less than 5% or less than 1% of the modulation symbols and/or resource elements in a block symbol). To a block symbol, there may be associated resource elements; a resource element may be represented in time/frequency domain, e.g., by the smallest frequency unit carrying or mapped to (e.g., a subcarrier) in frequency domain and the duration of a modulation symbol in time domain. A block symbol may comprise, and/or to a block symbol may be associated, a structure allowing and/or comprising a number of modulation symbols, and/or association to one or more channels (and/or the structure may dependent on the channel the block symbol is associated to and/or is allocated or used for), and/or reference signaling (e.g., as discussed above), and/or one or more guard periods and/or transient periods, and/or one or more affixes (e.g., a prefix and/or suffix and/or one or more infixes (entered inside the block symbol)), in particular a cyclic prefix and/or suffix and/or infix. A cyclic affix may represent a repetition of signaling and/or modulation symbol/s used in the block symbol, with possible slight amendments to the signaling structure of the affix to provide a smooth and/or continuous and/or differentiable connection between affix signaling and signaling of modulation symbols associated to the content of the block symbol (e.g., channel and/or reference signaling structure). In some cases, in particular some OFDM-based waveforms, an affix may be included into a modulation symbol. In other cases, e.g., some single carrier-based waveforms, an affix may be represented by a sequence of modulation symbols within the block symbol. It may be considered that in some cases a block symbol is defined and/or used in the context of the associated structure.

Communicating may comprise transmitting or receiving. It may be considered that communicating like transmitting signaling is based on a SC-FDM based waveform, and/or corresponds to a Frequency Domain Filtered (FDF) DFTS-OFDM waveform. However, the approaches may be applied to a Single Carrier based waveform, e.g., a SC-FDM or SC-FDE-waveform, which may be pulse-shaped/FDF-based. It should be noted that SC-FDM may be considered DFT-spread OFDM, such that SC-FDM and DFTS-OFDM may be used interchangeably. Alternatively, or additionally, the signaling (e.g., first signaling and/or second signaling) and/or beam/s (in particular, the first received beam and/or second received beam) may be based on a waveform with CP or comparable guard time. The received beam and the transmission beam of the first beam pair may have the same (or similar) or different angular and/or spatial extensions; the received beam and the transmission beam of the second beam pair may have the same (or similar) or different angular and/or spatial extensions. It may be considered that the received beam and/or transmission beam of the first and/or second beam pair have angular extension of 20 degrees or less, or 15 degrees or less, or 10 or 5 degrees or less, at least in one of horizontal or vertical direction, or both; different beams may have different angular extensions. An extended guard interval or switching protection interval may have a duration corresponding to essentially or at least N CP (cyclic prefix) durations or equivalent duration, wherein N may be 2, or 3 or 4. An equivalent to a CP duration may represent the CP duration associated to signaling with CP (e.g., SC-FDM-based or OFDM-based) for a waveform without CP with the same or similar symbol time duration as the signaling with CP. Pulse-shaping (and/or performing FDF for) a modulation symbol and/or signaling, e.g., associated to a first subcarrier or bandwidth, may comprise mapping the modulation symbol (and/or the sample associated to it after FFT) to an associated second subcarrier or part of the bandwidth, and/or applying a shaping operation regarding the power and/or amplitude and/or phase of the modulation symbol on the first subcarrier and the second subcarrier, wherein the shaping operation may be according to a shaping function. Pulse-shaping signaling may comprise pulse-shaping one or more symbols; pulse-shaped signaling may in general comprise at least one pulse-shaped symbol. Pulse-shaping may be performed based on a Nyquist-filter. It may be considered that pulse-shaping is performed based on periodically extending a frequency distribution of modulation symbols (and/or associated samples after FFT) over a first number of subcarrier to a larger, second number of subcarriers, wherein a subset of the first number of subcarriers from one end of the frequency distribution is appended at the other end of the first number of subcarriers.

In some variants, communicating may be based on a numerology (which may, e.g., be represented by and/or correspond to and/or indicate a subcarrier spacing and/or symbol time length) and/or an SC-FDM based waveform (including a FDF-DFTS-FDM based waveform) or a single-carrier based waveform. Whether to use pulse-shaping or FDF on a SC-FDM or SC-based waveform may depend on the modulation scheme (e.g., MCS) used. Such waveforms may utilise a cyclic prefix and/or benefit particularly from the described approaches. Communicating may comprise and/or be based on beamforming, e.g., transmission beamforming and/or reception beamforming, respectively. It may be considered that a beam is produced by performing analog beamforming to provide the beam, e.g., a beam corresponding to a reference beam. Thus, signaling may be adapted, e.g., based on movement of the communication partner. A beam may for example be produced by performing analog beamforming to provide a beam corresponding to a reference beam. This allows efficient postprocessing of a digitally formed beam, without requiring changes to a digital beamforming chain and/or without requiring changes to a standard defining beam forming precoders. In general, a beam may be produced by hybrid beamforming, and/or by digital beamforming, e.g., based on a precoder. This facilitates easy processing of beams, and/or limits the number of power amplifiers/ADC/DCA required for antenna arrangements. It may be considered that a beam is produced by hybrid beamforming, e.g., by analog beamforming performed on a beam representation or beam formed based on digital beamforming. Monitoring and/or performing cell search may be based on reception beamforming, e.g., analog or digital or hybrid reception beamforming. The numerology may determine the length of a symbol time interval and/or the duration of a cyclic prefix. The approaches described herein are particularly suitable to SC-FDM, to ensure orthogonality, in particular subcarrier orthogonality, in corresponding systems, but may be used for other waveforms. Communicating may comprise utilising a waveform with cyclic prefix. The cyclic prefix may be based on a numerology, and may help keeping signaling orthogonal. Communicating may comprise, and/or be based on performing cell search, e.g., for a wireless device or terminal, or may comprise transmitting cell identifying signaling and/or a selection indication, based on which a radio node receiving the selection indication may select a signaling bandwidth from a set of signaling bandwidths for performing cell search.

A beam or beam pair may in general be targeted at one radio node, or a group of radio nodes and/or an area including one or more radio nodes. In many cases, a beam or beam pair may be receiver-specific (e.g., UE-specific), such that only one radio node is served per beam/beam pair. A beam pair switch or switch of received beam (e.g., by using a different reception beam) and/or transmission beam may be performed at a border of a transmission timing structure, e.g., a slot border, or within a slot, for example between symbols. Some tuning of radio circuitry, e.g., for receiving and/or transmitting, may be performed. Beam pair switching may comprise switching from a second received beam to a first received beam, and/or from a second transmission beam to a first transmission beam. Switching may comprise inserting a guard period to cover retuning time; however, circuitry may be adapted to switch sufficiently quickly to essentially be instantaneous; this may in particular be the case when digital reception beamforming is used to switch reception beams for switching received beams.

A reference beam (or reference signaling beam) may be a beam comprising reference signaling, based on which for example a of beam signaling characteristics may be determined, e.g., measured and/or estimated. A signaling beam may comprise signaling like control signaling and/or data signaling and/or reference signaling. A reference beam may be transmitted by a source or transmitting radio node, in which case one or more beam signaling characteristics may be reported to it from a receiver, e.g., a wireless device. However, in some cases it may be received by the radio node from another radio node or wireless device. In this case, one or more beam signaling characteristics may be determined by the radio node. A signaling beam may be a transmission beam, or a reception beam. A set of signaling characteristics may comprise a plurality of subsets of beam signaling characteristics, each subset pertaining to a different reference beam. Thus, a reference beam may be associated to different beam signaling characteristics.

A beam signaling characteristic, respectively a set of such characteristics, may represent and/or indicate a signal strength and/or signal quality of a beam and/or a delay characteristic and/or be associated with received and/or measured signaling carried on a beam. Beam signaling characteristics and/or delay characteristics may in particular pertain to, and/or indicate, a number and/or list and/or order of beams with best (e.g., lowest mean delay and/or lowest spread/range) timing or delay spread, and/or of strongest and/or best quality beams, e.g., with associated delay spread. A beam signaling characteristic may be based on measurement/s performed on reference signaling carried on the reference beam it pertains to. The measurement/s may be performed by the radio node, or another node or wireless device. The use of reference signaling allows improved accuracy and/or gauging of the measurements. In some cases, a beam and/or beam pair may be represented by a beam identity indication, e.g., a beam or beam pair number. Such an indication may be represented by one or more signaling sequences (e.g., a specific reference signaling sequences or sequences), which may be transmitted on the beam and/or beam pair, and/or a signaling characteristic and/or a resource/s used (e.g., time/frequency and/or code) and/or a specific RNTI (e.g., used for scrambling a CRC for some messages or transmissions) and/or by information provided in signaling, e.g., control signaling and/or system signaling, on the beam and/or beam pair, e.g., encoded and/or provided in an information field or as information element in some form of message of signaling, e.g., DCI and/or MAC and/or RRC signaling.

A reference beam may in general be one of a set of reference beams, the second set of reference beams being associated to the set of signaling beams. The sets being associated may refer to at least one beam of the first set being associated and/or corresponding to the second set (or vice versa), e.g., being based on it, for example by having the same analog or digital beamforming parameters and/or precoder and/or the same shape before analog beamforming, and/or being a modified form thereof, e.g., by performing additional analog beamforming. The set of signaling beams may be referred to as a first set of beams, a set of corresponding reference beams may be referred to as second set of beams.

In some variants, a reference beam and/or reference beams and/or reference signaling may correspond to and/or carry random access signaling, e.g., a random access preamble. Such a reference beam or signaling may be transmitted by another radio node. The signaling may indicate which beam is used for transmitting. Alternatively, the reference beams may be beams receiving the random access signaling. Random access signaling may be used for initial connection to the radio node and/or a cell provided by the radio node, and/or for reconnection. Utilising random access signaling facilitates quick and early beam selection. The random access signaling may be on a random access channel, e.g., based on broadcast information provided by the radio node (the radio node performing the beam selection), e.g., with synchronisation signaling (e.g., SSB block and/or associated thereto). The reference signaling may correspond to synchronisation signaling, e.g., transmitted by the radio node in a plurality of beams. The characteristics may be reported on by a node receiving the synchronisation signaling, e.g., in a random access process, e.g., a msg3 for contention resolution, which may be transmitted on a physical uplink shared channel based on a resource allocation provided by the radio node.

A delay characteristic (which may correspond to delay spread information) and/or a measurement report may represent and/or indicate at least one of mean delay, and/or delay spread, and/or delay distribution, and/or delay spread distribution, and/or delay spread range, and/or relative delay spread, and/or energy (or power) distribution, and/or impulse response to received signaling, and/or the power delay profile of the received signals, and/or power delay profile related parameters of the received signal. A mean delay may represent the mean value and/or an averaged value of the delay spread, which may be weighted or unweighted. A distribution may be distribution over time/delay, e.g., of received power and/or energy of a signal. A range may indicate an interval of the delay spread distribution over time/delay, which may cover a predetermined percentage of the delay spread respective received energy or power, e.g., 50% or more, 75% or more, 90% or more, or 100%. A relative delay spread may indicate a relation to a threshold delay, e.g., of the mean delay, and/or a shift relative to an expected and/or configured timing, e.g., a timing at which the signaling would have been expected based on the scheduling, and/or a relation to a cyclic prefix duration (which may be considered on form of a threshold). Energy distribution or power distribution may pertain to the energy or power received over the time interval of the delay spread. A power delay profile may pertain to representations of the received signals, or the received signals energy/power, across time/delay. Power delay profile related parameters may pertain to metrics computed from the power delay profile. Different values and forms of delay spread information and/or report may be used, allowing a wide range of capabilities. The kind of information represented by a measurement report may be predefined, or be configured or configurable, e.g., with a measurement configuration and/or reference signaling configuration, in particular with higher layer signaling like RRC or MAC signaling and/or physical layer signaling like DCI signaling.

In general, different beam pair may differ in at least one beam; for example, a beam pair using a first received beam and a first transmission beam may be considered to be different from a second beam pair using the first received beam and a second transmission beam. A transmission beam using no precoding and/or beamforming, for example using the natural antenna profile, may be considered as a special form of transmission beam of a transmission beam pair. A beam may be indicated to a radio node by a transmitter with a beam indication and/or a configuration, which for example may indicate beam parameters and/or time/frequency resources associated to the beam and/or a transmission mode and/or antenna profile and/or antenna port and/or precoder associated to the beam. Different beams may be provided with different content, for example different received beams may carry different signaling; however, there may be considered cases in which different beams carry the same signaling, for example the same data signaling and/or reference signaling. The beams may be transmitted by the same node and/or transmission point and/or antenna arrangement, or by different nodes and/or transmission points and/or antenna arrangements.

Communicating utilising a beam pair or a beam may comprise receiving signaling on a received beam (which may be a beam of a beam pair), and/or transmitting signaling on a beam, e.g., a beam of a beam pair. The following terms are to be interpreted from the point of view of the referred radio node: a received beam may be a beam carrying signaling received by the radio node (for reception, the radio node may use a reception beam, e.g., directed to the received beam, or be non-beamformed). A transmission beam may be a beam used by the radio node to transmit signaling. A beam pair may consist of a received beam and a transmission beam. The transmission beam and the received beam of a beam pair may be associated to each and/or correspond to each other, e.g., such that signaling on the received beam and signaling on a transmission beam travel essentially the same path (but in opposite directions), e.g., at least in a stationary or almost stationary condition. It should be noted that the terms "first" and "second" do not necessarily denote an order in time; a second signaling may be received and/or transmitted before, or in some cases simultaneous to, first signaling, or vice versa. The received beam and transmission beam of a beam pair may be on the same carrier or frequency range or bandwidth part, e.g., in a TDD operation; however, variants with FDD may be considered as well. Different beam pairs may operate on the same frequency ranges or carriers or bandwidth parts (e.g., such that transmission beams operate on the same frequency range or carriers or bandwidth part, and received beams on the same frequency range or carriers or bandwidth part (the transmission beam and received beams may be on the same or different ranges or carriers or BWPs). Communicating utilizing a first beam pair and/or first beam may be based on, and/or comprise, switching from the second beam pair or second beam to the first beam pair or first beam for communicating. The switching may be controlled by the network, for example a network node (which may be the source or transmitter of the received beam of the first beam pair and/or second beam pair, or be associated thereto, for example associated transmission points or nodes in dual connectivity). Such controlling may comprise transmitting control signaling, e.g., physical layer signaling and/or higher layer signaling. In some cases, the switching may be performed by the radio node without additional control signaling, for example based on measurements on signal quality and/or signal strength of beam pairs (e.g., of first and second received beams), in particular the first beam pair and/or the second beam pair. For example, it may be switched to the first beam pair (or first beam) if the signal quality or signal strength measured on the second beam pair (or second beam) is considered to be insufficient, and/or worse than corresponding measurements on the first beam pair indicate. Measurements performed on a beam pair (or beam) may in particular comprise measurements performed on a received beam of the beam pair. It may be considered that the timing indication may be determined before switching from the second beam pair to the first beam pair for communicating. Thus, the synchronization may be in place and/or the timing indication may be available for synchronising) when starting communication utilizing the first beam pair or first beam. However, in some cases the timing indication may be determined after switching to the first beam pair or first beam. This may be in particular useful if first signaling is expected to be received after the switching only, for example based on a periodicity or scheduled timing of suitable reference signaling on the first beam pair, e.g., first received beam. In general, a reception beam of a node may be associated to and/or correspond to a transmission beam of the node, e.g., such that the (spatial) angle of reception of the reception beam and the (spatial) angle of transmission of the transmission beam at least partially, or essentially or fully, overlap and/or coincide, in particular for TDD operation and/or independent of frequency. Spatial correspondence between beams may be considered in some cases, e.g., such that a beam pair (e.g., transmission beam of a transmitting node and reception beam of a receiving node) may be considered to comprise corresponding beams (e.g., the reception beam is suitable and/or the best beam to receive transmissions on the transmission beam, e.g., based on a threshold signal quality and/or signal strength and/or measurements); to each of such beams, there may be an associated or corresponding complementary beam of the respective node (e.g., to a transmission beam of a beam pair, there may be associated a reception beam of the transmitting node, and/or to the reception beam of a beam pair, there may be associated a transmitting beam of the receiving node; if the beams (e.g., at least essentially or substantially) overlap (e.g., in spatial angle), in some cases a beam pair may be considered to indicate four beams (or actually, two beam pairs).

In some variants, reference signaling may be and/or comprise CSI-RS, e.g., transmitted by the network node. In other variants, the reference signaling may be transmitted by a UE, e.g., to a network node or other UE, in which case it may comprise and/or be Sounding Reference Signaling. Other, e.g., new, forms of reference signaling may be considered and/or used. In general, a modulation symbol of reference signaling respectively a resource element carrying it may be associated to a cyclic prefix.

Data signaling may be on a data channel, for example on a PDSCH or PSSCH, or on a dedicated data channel, e.g., for low latency and/or high reliability, e.g., a URLLC channel. Control signaling may be on a control channel, for example on a common control channel or a PDCCH or PSCCH, and/or comprise one or more DCI messages or SCI messages. Reference signaling may be associated to control signaling and/or data signaling, e.g., DM-RS and/or PT-RS.

Reference signaling, for example, may comprise DM-RS and/or pilot signaling and/or discovery signaling and/or synchronisation signaling and/or sounding signaling and/or phase tracking signaling and/or cell-specific reference signaling and/or user-specific signaling, in particular CSI-RS. Reference signaling in general may be signaling with one or more signaling characteristics, in particular transmission power and/or sequence of modulation symbols and/or resource distribution and/or phase distribution known to the receiver. Thus, the receiver can use the reference signaling as a reference and/or for training and/or for compensation. The receiver can be informed about the reference signaling by the transmitter, e.g., being configured and/or signaling with control signaling, in particular physical layer signaling and/or higher layer signaling (e.g., DCI and/or RRC signaling), and/or may determine the corresponding information itself, e.g., a network node configuring a UE to transmit reference signaling. Reference signaling may be signaling comprising one or more reference symbols and/or structures. Reference signaling may be adapted for gauging and/or estimating and/or representing transmission conditions, e.g., channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g., pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g., power-related or energy-related or amplitude-related (e.g., SRS or pilot signaling) and/or phase-related, etc.

References to specific resource structures like an allocation unit and/or block symbol and/or block symbol group and/or transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g., predefined and/or configured or configurable, number of symbols, e.g., 6 or 7, or 12 or 14. A mini-slot may comprise a number of symbols (which may in particular be configurable or configured) smaller than the number of symbols of a slot, in particular 1, 2, 3 or 4, or more symbols, e.g., less symbols than symbols in a slot. A transmission timing structure may cover a time interval of a specific length, which may be dependent on symbol time length and/or cyclic prefix used. A transmission timing structure may pertain to, and/or cover, a specific time interval in a time stream, e.g., synchronized for communication. Timing structures used and/or scheduled for transmission, e.g., slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

A transmission quality parameter may in general correspond to the number R of retransmissions and/or number T of total transmissions, and/or coding (e.g., number of coding bits, e.g., for error detection coding and/or error correction coding like FEC coding) and/or code rate and/or BLER and/or BER requirements and/or transmission power level (e.g., minimum level and/or target level and/or base power level PO and/or transmission power control command, TPC, step size) and/or signal quality, e.g., SNR and/or SIR and/or SINR and/or power density and/or energy density.

A buffer state report (or buffer status report, BSR) may comprise information representing the presence and/or size of data to be transmitted (e.g., available in one or more buffers, for example provided by higher layers). The size may be indicated explicitly, and/or indexed to range/s of sizes, and/or may pertain to one or more different channel/s and/or acknowledgement processes and/or higher layers and/or channel groups/s, e.g., one or more logical channel/s and/or transport channel/s and/or groups thereof: The structure of a BSR may be predefined and/or configurable of configured, e.g., to override and/or amend a predefined structure, for example with higher layer signaling, e.g., RRC signaling. There may be different forms of BSR with different levels of resolution and/or information, e.g., a more detailed long BSR and a less detailed short BSR. A short BSR may concatenate and/or combine information of a long BSR, e.g., providing sums for data available for one or more channels and/or or channels groups and/or buffers, which might be represented individually in a long BSR; and/or may index a less-detailed range scheme for data available or buffered. A BSR may be used in lieu of a scheduling request, e.g., by a network node scheduling or allocating (uplink) resources for the transmitting radio node like a wireless device or UE or IAB node.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g., radio waves or microwaves, and/or optically transmissive material, e.g., glass fiber, and/or or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g., by triggering a different system or node to stream and/or transfer and/or send and/or pass on the information. The information system may comprise, and/or be connected or connectable to, a target, for example via one or more intermediate systems, e.g., a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g., based on information received from the target and/or historical information, and/or be provided by a user, for example a user operating the target or a device in communication with the target, e.g., via the RAN and/or air interface. For example, a user may indicate on a user equipment communicating with the information system that information is to be provided via a RAN, e.g., by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g., a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g., video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g., regarding data amount and/or data rate and/or data structure and/or timing, which in particular may be pertaining to a mapping to communication or data signaling and/or a data channel. Mapping information to data signaling and/or data channel/s may be considered to refer to using the signaling/channel/s to carry the data, e.g., on higher layers of communication, with the signaling/ channel/s underlying the transmission. A target indication generally may comprise different components, which may have different sources, and/or which may indicate different characteristics of the target and/or communication path/s thereto. A format of information may be specifically selected, e.g., from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g., if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g., decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g., on an air interface, which may include mapping the information onto signaling (such mapping may generally pertain to one or more layers, e.g., one or more layers of an air interface, e.g., RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g., for providing and/or selecting the target indication, and/or presenting, e.g., video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g., application layer or user-layer, in particular above radio layers like transport layer and physical layer. The target indication may be mapped on physical layer radio signaling, e.g., related to or on the user-plane, and/or the information may be mapped on physical layer radio communication signaling, e.g., related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g., in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier, and/or the symbol time length. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths, even on the same carrier.

Signaling may generally comprise one or more (e.g., modulation) symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g., representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g., representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An antenna arrangement may comprise one or more antenna elements (radiating elements), which may be combined in antenna arrays. An antenna array or subarray may comprise one antenna element, or a plurality of antenna elements, which may be arranged e.g., two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g., a configuring or informing or scheduling radio node, e.g., to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g., to change the beamforming characteristics. In particular, antenna arrays may be formed by combining one or more independently or separately controllable antenna elements or subarrays. The beams may be provided by analog beamforming, or in some variants by digital beamforming, or by hybrid beamforming combing analog and digital beamforming. The informing radio nodes may be configured with the manner of beam transmission, e.g., by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) or DCA (Digital-to-Analog Converter, alternatively a DCA chain) to convert digital control information into an analog antenna feed for the whole antenna arrangement (the ADC/DCA may be considered part of, and/or connected or connectable to, antenna circuitry) or vice versa. A scenario in which an ADC or DCA is controlled directly for beamforming may be considered an analog beamforming scenario; such controlling may be performed after encoding/decoding and 7 or after modulation symbols have been mapped to resource elements. This may be on the level of antenna arrangements using the same ADC/DCA, e.g., one antenna element or a group of antenna elements associated to the same ADC/DCA. Digital beamforming may correspond to a scenario in which processing for beamforming is provided before feeding signaling to the ADC/DCA, e.g., by using one or more precoder/s and/or by precoding information, for example before and/or when mapping modulation symbols to resource elements. Such a precoder for beamforming may provide weights, e.g., for amplitude and/or phase, and/or may be based on a (precoder) codebook, e.g., selected from a codebook. A precoder may pertain to one beam or more beams, e.g., defining the beam or beams. The codebook may be configured or configurable, and/or be predefined. DFT beamforming may be considered a form of digital beamforming, wherein a DFT procedure is used to form one or more beams. Hybrid forms of beamforming may be considered.

A beam may be defined by a spatial and/or angular and/or spatial angular distribution of radiation and/or a spatial angle (also referred to as solid angle) or spatial (solid) angle distribution into which radiation is transmitted (for transmission beamforming) or from which it is received (for reception beamforming). Reception beamforming may comprise only accepting signals coming in from a reception beam (e.g., using analog beamforming to not receive outside reception beam/s), and/or sorting out signals that do not come in in a reception beam, e.g., in digital postprocessing, e.g., digital beamforming. A beam may have a solid angle equal to or smaller than 4*pi sr (4*pi correspond to a beam covering all directions), in particular smaller than 2*pi, or pi, or pi/2, or pi/4 or pi/8 or pi/16. In particular for high frequencies, smaller beams may be used. Different beams may have different directions and/or sizes (e.g., solid angle and/or reach). A beam may have a main direction, which may be defined by a main lobe (e.g., center of the main lobe, e.g., pertaining to signal strength and/or solid angle, which may be averaged and/or weighted to determine the direction), and may have one or more sidelobes. A lobe may generally be defined to have a continuous or contiguous distribution of energy and/or power transmitted and/or received, e.g., bounded by one or more contiguous or contiguous regions of zero energy (or practically zero energy). A main lobe may comprise the lobe with the largest signal strength and/or energy and/or power content. However, sidelobes usually appear due to limitations of beamforming, some of which may carry signals with significant strength, and may cause multi-path effects. A sidelobe may generally have a different direction than a main lobe and/or other side lobes, however, due to reflections a sidelobe still may contribute to transmitted and/or received energy or power. A beam may be swept and/or switched over time, e.g., such that its (main) direction is changed, but its shape (angular/solid angle distribution) around the main direction is not changed, e.g., from the transmitter's views for a transmission beam, or the receiver's view for a reception beam, respectively. Sweeping may correspond to continuous or near continuous change of main direction (e.g., such that after each change, the main lobe from before the change covers at least partly the main lobe after the change, e.g., at least to 50 or 75 or 90 percent). Switching may correspond to switching direction non-continuously, e.g., such that after each change, the main lobe from before the change does not cover the main lobe after the change, e.g., at most to 50 or 25 or 10 percent.

Signal strength may be a representation of signal power and/or signal energy, e.g., as seen from a transmitting node or a receiving node. A beam with larger strength at transmission (e.g., according to the beamforming used) than another beam does may not necessarily have larger strength at the receiver, and vice versa, for example due to interference and/or obstruction and/or dispersion and/or absorption and/or reflection and/or attrition or other effects influencing a beam or the signaling it carries. Signal quality may in general be a representation of how well a signal may be received over noise and/or interference. A beam with better signal quality than another beam does not necessarily have a larger beam strength than the other beam. Signal quality may be represented for example by SIR, SNR, SINR, BER, BLER, Energy per resource element over noise/interference or another corresponding quality measure. Signal quality and/or signal strength may pertain to, and/or may be measured with respect to, a beam, and/or specific signaling carried by the beam, e.g., reference signaling and/or a specific channel, e.g., a data channel or control channel. Signal strength may be represented by received signal strength, and/or relative signal strength, e.g., in comparison to a reference signal (strength).

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling and/or Single-Carrier based signaling, e.g., SC-FDE signaling, may be considered alternatives).

A radio node may generally be considered a device or node adapted for wireless and/or radio (and/or millimeter wave) frequency communication, and/or for communication utilising an air interface, e.g., according to a communication standard.

A radio node may be a network node, or a user equipment or terminal. A network node may be any radio node of a wireless communication network, e.g., a base station and/or gNodeB (gNB) and/or eNodeB (eNB) and/or relay node and/or micro/nano/pico/femto node and/or transmission point (TP) and/or access point (AP) and/or other node, in particular for a RAN or other wireless communication network as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g., in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g., in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g., 2D or 3D array, and/or antenna panels. A remote radio head (RRH) may be considered as an example of an antenna array. However, in some variants, an RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g., laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g., controlled by communication circuitry and/or processing circuitry.

Any one or all of the modules disclosed herein may be implemented in software and/or firmware and/or hardware. Different modules may be associated to different components of a radio node, e.g., different circuitries, or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A wireless communication network may be or comprise a radio access network and/or a backhaul network (e.g., a relay or backhaul network or an IAB network), and/or a Radio Access Network (RAN) in particular according to a communication standard. A communication standard may in particular a standard according to 3GPP and/or 5G, e.g., according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g., LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g., a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes.

There may be generally considered a wireless communication network or system, e.g., a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g., a physical control channel, which may be a downlink channel or (or a sidelink channel in some cases, e.g., one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g., as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Transmitting acknowledgement signaling may in general be based on and/or in response to subject transmission, and/or to control signaling scheduling subject transmission. Such control signaling and/or subject signaling may be transmitted by a signaling radio node (which may be a network node, and/or a node associated to it, e.g., in a dual connectivity scenario. Subject transmission and/or subject signaling may be transmission or signaling to which ACK/NACK or acknowledgement information pertains, e.g., indicating correct or incorrect reception and/or decoding of the subject transmission or signaling. Subject signaling or transmission may in particular comprise and/or be represented by data signaling, e.g., on a PDSCH or PSSCH, or some forms of control signaling, e.g., on a PDCCH or PSSCH, for example for specific formats.

A signaling characteristic may be based on a type or format of a scheduling grant and/or scheduling assignment, and/or type of allocation, and/or timing of acknowledgement signaling and/or the scheduling grant and/or scheduling assignment, and/or resources associated to acknowledgement signaling and/or the scheduling grant and/or scheduling assignment. For example, if a specific format for a scheduling grant (scheduling or allocating the allocated resources) or scheduling assignment (scheduling the subject transmission for acknowledgement signaling) is used or detected, the first or second communication resource may be used. Type of allocation may pertain to dynamic allocation (e.g., using DCI/PDCCH) or semi-static allocation (e.g., for a configured grant). Timing of acknowledgement signaling may pertain to a slot and/or symbol/s the signaling is to be transmitted. Resources used for acknowledgement signaling may pertain to the allocated resources. Timing and/or resources associated to a scheduling grant or assignment may represent a search space or CORESET (a set of resources configured for reception of PDCCH transmissions) in which the grant or assignment is received. Thus, which transmission resource to be used may be based on implicit conditions, requiring low signaling overhead.

Scheduling may comprise indicating, e.g., with control signaling like DCI or SCI signaling and/or signaling on a control channel like PDCCH or PSCCH, one or more scheduling opportunities of a configuration intended to carry data signaling or subject signaling. The configuration may be represented or representable by, and/or correspond to, a table. A scheduling assignment may for example point to an opportunity of the reception allocation configuration, e.g., indexing a table of scheduling opportunities. In some cases, a reception allocation configuration may comprise 15 or 16 scheduling opportunities. The configuration may in particular represent allocation in time. It may be considered that the reception allocation configuration pertains to data signaling, in particular on a physical data channel like PDSCH or PSSCH. In general, the reception allocation configuration may pertain to downlink signaling, or in some scenarios to sidelink signaling. Control signaling scheduling subject transmission like data signaling may point and/or index and/or refer to and/or indicate a scheduling opportunity of the reception allocation configuration. It may be considered that the reception allocation configuration is configured or configurable with higher-layer signaling, e.g., RRC or MAC layer signaling. The reception allocation configuration may be applied and/or applicable and/or valid for a plurality of transmission timing intervals, e.g., such that for each interval, one or more opportunities may be indicated or allocated for data signaling. These approaches allow efficient and flexible scheduling, which may be semi-static, but may updated or reconfigured on useful timescales in response to changes of operation conditions.

Control information, e.g., in a control information message, in this context may in particular be implemented as and/or represented by a scheduling assignment, which may indicate subject transmission for feedback (transmission of acknowledgement signaling), and/or reporting timing and/or frequency resources and/or code resources. Reporting timing may indicate a timing for scheduled acknowledgement signaling, e.g., slot and/or symbol and/or resource set. Control information may be carried by control signaling.

Subject transmissions may comprise one or more individual transmissions. Scheduling assignments may comprise one or more scheduling assignments. It should generally be noted that in a distributed system, subject transmissions, configuration and/or scheduling may be provided by different nodes or devices or transmission points. Different subject transmissions may be on the same carrier or different carriers (e.g., in a carrier aggregation), and/or same or different bandwidth parts, and/or on the same or different layers or beams, e.g., in a MIMO scenario, and/or to same or different ports. Generally, subject transmissions may pertain to different HARQ or ARQ processes (or different sub-processes, e.g., in MIMO with different beams/layers associated to the same process identifier, but different sub-process-identifiers like swap bits). A scheduling assignment and/or a HARQ codebook may indicate a target HARQ structure. A target HARQ structure may for example indicate an intended HARQ response to a subject transmission, e.g., the number of bits and/or whether to provide code block group level response or not. However, it should be noted that the actual structure used may differ from the target structure, e.g., due to the total size of target structures for a subpattern being larger than the predetermined size.

Transmitting acknowledgement signaling, also referred to as transmitting acknowledgement information or feedback information or simply as ARQ or HARQ feedback or feedback or reporting feedback, may comprise, and/or be based on determining correct or incorrect reception of subject transmission/s, e.g., based on error coding and/or based on scheduling assignment/s scheduling the subject transmissions. Transmitting acknowledgement information may be based on, and/or comprise, a structure for acknowledgement information to transmit, e.g., the structure of one or more subpatterns, e.g., based on which subject transmission is scheduled for an associated subdivision. Transmitting acknowledgement information may comprise transmitting corresponding signaling, e.g., at one instance and/or in one message and/or one channel, in particular a physical channel, which may be a control channel. In some cases, the channel may be a shared channel or data channel, e.g., utilising rate-matching of the acknowledgment information. The acknowledgement information may generally pertain to a plurality of subject transmissions, which may be on different channels and/or carriers, and/or may comprise data signaling and/or control signaling. The acknowledgment information may be based on a codebook, which may be based on one or more size indications and/or assignment indications (representing HARQ structures), which may be received with a plurality of control signalings and/or control messages, e.g., in the same or different transmission timing structures, and/or in the same or different (target) sets of resources. Transmitting acknowledgement information may comprise determining the codebook, e.g., based on control information in one or more control information messages and/or a configuration. A codebook may pertain to transmitting acknowledgement information at a single and/or specific instant, e.g., a single PUCCH or PUSCH transmission, and/or in one message or with jointly encoded and/or modulated acknowledgement information. Generally, acknowledgment information may be transmitted together with other control information, e.g., a scheduling request and/or measurement information.

Acknowledgement signaling may in some cases comprise, next to acknowledgement information, other information, e.g., control information, in particular uplink or sidelink control information, like a scheduling request and/or measurement information, or similar, and/or error detection and/or correction information, respectively associated bits. The payload size of acknowledgement signaling may represent the number of bits of acknowledgement information, and/or in some cases the total number of bits carried by the acknowledgement signaling, and/or the number of resource elements needed. Acknowledgement signaling and/or information may pertain to ARQ and/or HARQ processes; an ARQ process may provide ACK/NACK (and perhaps additional feedback) feedback, and decoding may be performed on each (re-)transmission separately, without soft-buffering/soft-combining intermediate data, whereas HARQ may comprise soft-buffering/soft-combining of intermediate data of decoding for one or more (re-)transmissions.

Subject transmission may be data signaling or control signaling. The transmission may be on a shared or dedicated channel. Data signaling may be on a data channel, for example on a PDSCH or PSSCH, or on a dedicated data channel, e.g., for low latency and/or high reliability, e.g., a URLLC channel. Control signaling may be on a control channel, for example on a common control channel or a PDCCH or PSCCH, and/or comprise one or more DCI messages or SCI messages. In some cases, the subject transmission may comprise, or represent, reference signaling. For example, it may comprise DM-RS and/or pilot signaling and/or discovery signaling and/or sounding signaling and/or phase tracking signaling and/or cell-specific reference signaling and/or user-specific signaling, in particular CSI-RS. A subject transmission may pertain to one scheduling assignment and/or one acknowledgement signaling process (e.g., according to identifier or subidentifier), and/or one subdivision. In some cases, a subject transmission may cross the borders of subdivisions in time, e.g., due to being scheduled to start in one subdivision and extending into another, or even crossing over more than one subdivision. In this case, it may be considered that the subject transmission is associated to the subdivision it ends in.

It may be considered that transmitting acknowledgement information, in particular of acknowledgement information, is based on determining whether the subject transmission/s has or have been received correctly, e.g., based on error coding and/or reception quality. Reception quality may for example be based on a determined signal quality. Acknowledgement information may generally be transmitted to a signaling radio node and/or node arrangement and/or to a network and/or network node.

Acknowledgement information, or bit/s of a subpattern structure of such information (e.g., an acknowledgement information structure, may represent and/or comprise one or more bits, in particular a pattern of bits. Multiple bits pertaining to a data structure or substructure or message like a control message may be considered a subpattern. The structure or arrangement of acknowledgement information may indicate the order, and/or meaning, and/or mapping, and/or pattern of bits (or subpatterns of bits) of the information. The structure or mapping may in particular indicate one or more data block structures, e.g., code blocks and/or code block groups and/or transport blocks and/or messages, e.g., command messages, the acknowledgement information pertains to, and/or which bits or subpattern of bits are associated to which data block structure. In some cases, the mapping may pertain to one or more acknowledgement signaling processes, e.g., processes with different identifiers, and/or one or more different data streams. The configuration or structure or codebook may indicate to which process/es and/or data stream/s the information pertains. Generally, the acknowledgement information may comprise one or more subpatterns, each of which may pertain to a data block structure, e.g., a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signaling. Different configurations may indicate different sizes and/or mapping and/or structures and/or pattern.

An acknowledgment signaling process (providing acknowledgment information) may be a HARQ process, and/or be identified by a process identifier, e.g., a HARQ process identifier or subidentifier. Acknowledgement signaling and/or associated acknowledgement information may be referred to as feedback or acknowledgement feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signaling may comprise padding bits, e.g., if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g., pertaining to an acknowledgment signaling process, or an element of a data block structure like a data block, subblock group or subblock, or a message, in particular a control message. Generally, to an acknowledgment signaling process there may be associated one specific subpattern and/or a data block structure, for which acknowledgment information may be provided. Acknowledgement information may comprise a plurality of pieces of information, represented in a plurality of ARQ and/or HARQ structures.

An acknowledgment signaling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g., subblock/subblock group/data block) the subpattern provides acknowledgement information for and/or is associated to may be considered its (highest) resolution. In some variants, a subpattern may provide acknowledgment information regarding several elements of a data block structure and/or at different resolution, e.g., to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g., user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g., utilising an error correction coding scheme, in particular for forward error correction (FEC), e.g., LDPC or polar coding and/or turbo coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g., for an internet protocol like TCP. However, such error handling information represents information bits in the context of this disclosure, as the acknowledgement signaling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g., based on LDPC or polar coding or Reed-Mueller coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g., code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied to a transport block, however, it may be considered to apply either or both. In some specific variants, the code block group/s comprise no additional layers of error detection or correction coding, and the transport block may comprise only additional error detection coding bits, but no additional error correction coding. This may particularly be true if the transport block size is larger than the code block size and/or the maximum size for error correction coding. A subpattern of acknowledgement signaling (in particular indicating ACK or NACK) may pertain to a code block, e.g., indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g., based on a logical AND operation), and NACK or another state of non-correct reception if at least one subblock or code block has not been correctly received.

It should be noted that a code block may be considered to be correctly received not only if it actually has been correctly received, but also if it can be correctly reconstructed based on soft-combining and/or the error correction coding.

A subpattern/HARQ structure may pertain to one acknowledgement signaling process and/or one carrier like a component carrier and/or data block structure or data block. It may in particular be considered that one (e.g., specific and/or single) subpattern pertains, e.g., is mapped by the codebook, to one (e.g., specific and/or single) acknowledgement signaling process, e.g., a specific and/or single HARQ process. It may be considered that in the bit pattern, subpatterns are mapped to acknowledgement signaling processes and/or data blocks or data block structures on a one-to-one basis. In some variants, there may be multiple subpatterns (and/or associated acknowledgment signaling processes) associated to the same component carrier, e.g., if multiple data streams transmitted on the carrier are subject to acknowledgement signaling processes. A subpattern may comprise one or more bits, the number of which may be considered to represent its size or bit size. Different bit n-tupels (n being 1 or larger) of a subpattern may be associated to different elements of a data block structure (e.g., data block or subblock or subblock group), and/or represent different resolutions. There may be considered variants in which only one resolution is represented by a bit pattern, e.g., a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g., to improve disambiguity of bit sequences representing ACK or NACK, and/or to improve transmission reliability.

The acknowledgement information or feedback information may pertain to a plurality of different transmissions, which may be associated to and/or represented by data block structures, respectively the associated data blocks or data signaling. The data block structures, and/or the corresponding blocks and/or signaling, may be scheduled for simultaneous transmission, e.g., for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g., different slots (or mini-slots, or slots and mini-slots) or similar, which may correspondingly be received (or not or wrongly received). Scheduling signaling may generally comprise indicating resources, e.g., time and/or frequency resources, for example for receiving or transmitting the scheduled signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g., comprising, or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g., CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g., a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g., as defined by a standard. A carrier may define a frequency and/or frequency band for transmission and/or reception. In some variants, a signal (jointly encoded/modulated) may cover more than one resource elements. A resource element may generally be as defined by a corresponding standard, e.g., NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g., according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g., a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g., representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g., on a physical downlink channel like a shared channel, e.g., a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g., transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g., downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g., one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g., one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may generally represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g., a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g., due to circuitry and/or configuration and/or regulations and/or a standard. A bandwidth part may be configured or configurable to a radio node. In some variants, a bandwidth part may be the part of a bandwidth used for communicating, e.g., transmitting and/or receiving, by a radio node. The bandwidth part may be smaller than the bandwidth (which may be a device bandwidth defined by the circuitry/configuration of a device, and/or a system bandwidth, e.g., available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g., represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising millimeter waves, in particular above one of the thresholds 10 GHz or 20 GHz or 50 GHz or 52 GHz or 52.6 GHz or 60 GHz or 72 GHz or 100 GHz or 114 GHz. Such communication may utilise one or more carriers, e.g., in FDD and/or carrier aggregation. Upper frequency boundaries may correspond to 300 GHz or 200 GHz or 120 GHz or any of the thresholds larger than the one representing the lower frequency boundary.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on an LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g., prefix or postfix.

A sidelink may generally represent a communication channel (or channel structure) between two UEs and/or terminals, in which data is transmitted between the participants (UEs and/or terminals) via the communication channel, e.g., directly and/or without being relayed via a network node. A sidelink may be established only and/or directly via air interface/s of the participant, which may be directly linked via the sidelink communication channel. In some variants, sidelink communication may be performed without interaction by a network node, e.g., on fixedly defined resources and/or on resources negotiated between the participants. Alternatively, or additionally, it may be considered that a network node provides some control functionality, e.g., by configuring resources, in particular one or more resource pool/s, for sidelink communication, and/or monitoring a sidelink, e.g., for charging purposes.

Sidelink communication may also be referred to as device-to-device (D2D) communication, and/or in some cases as ProSe (Proximity Services) communication, e.g., in the context of LTE. A sidelink may be implemented in the context of V2x communication (Vehicular communication), e.g., V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g., a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g., according to a specific license and/or standard. Participants may share a (physical) channel and/or resources, in particular in frequency domain and/or related to a frequency resource like a carrier) of a sidelink, such that two or more participants transmit thereon, e.g., simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g., an LTE-based standard and/or NR. A sidelink may utilise TDD (Time Division Duplex) and/or FDD (Frequency Division Duplex) technology, e.g., as configured by a network node, and/or preconfigured and/or negotiated between the participants. A user equipment may be considered to be adapted for sidelink communication if it, and/or its radio circuitry and/or processing circuitry, is adapted for utilising a sidelink, e.g., on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g., associated resources and/or transmission formats and/or circuitry and/or the air interface. Sidelink reception and/or receiving on a sidelink may be considered to comprise reception utilising the sidelink, e.g., associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g., DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g., be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g., one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g., stored in memory, for example independent of being configured. Configured or configurable may be considered to pertain to the corresponding information being set/configured, e.g., by the network or a network node.

A configuration or schedule, like a mini-slot configuration and/or structure configuration, may schedule transmissions, e.g., for the time/transmissions it is valid, and/or transmissions may be scheduled by separate signaling or separate configuration, e.g., separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g., PUSCH, PUCCH or PDSCH, and/or may pertain to a specific cell and/or carrier aggregation. A corresponding configuration, e.g., scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time and/or frequency domain for intended or scheduled or reserved for control signaling, in particular downlink control signaling, and/or for a specific control channel, e.g., a physical downlink control channel like PDCCH. The interval may comprise, and/or consist of, a number of symbols in time, which may be configured or configurable, e.g., by (UE-specific) dedicated signaling (which may be single-cast, for example addressed to or intended for a specific UE), e.g., on a PDCCH, or RRC signaling, or on a multicast or broadcast channel. In general, the transmission timing structure may comprise a control region covering a configurable number of symbols. It may be considered that in general the border symbol is configured to be after the control region in time. A control region may be associated, e.g., via configuration and/or determination, to one or more specific UEs and/or formats of PDCCH and/or DCI and/or identifiers, e.g., UE identifiers and/or RNTIs or carrier/cell identifiers, and/or be represented and/or associated to a CORESET and/or a search space.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g., in relation to the timing grid. A transmission timing structure may in particular be a slot or subframe or in some cases, a mini-slot.

Feedback signaling may be considered a form or control signaling, e.g., uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g., a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g., time and/or frequency. The resource elements of a substructure may be scheduled for associated signaling.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g., one or more transmission timing structures like slots or slot aggregations, and/or for one or more (e.g., specific number) of transmission/occurrences. Dynamic configuration may be based on low-level signaling, e.g., control signaling on the physical layer and/or MAC layer, in particular in the form of DCI or SCI. Periodic/semi-static may pertain to longer timescales, e.g., several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM) or IEEE standards as IEEE 802.11ad or IEEE 802.11 ay. While described variants may pertain to certain Technical Specifications (TSs) of the Third Generation Partnership Project (3GPP), it will be appreciated that the present approaches, concepts, and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g., a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
|---|---|
| ACK/NACK | Acknowledgment/Negative Acknowledgement |
| ARQ | Automatic Repeat reQuest |
| BER | Bit Error Rate |
| BLER | Block Error Rate |
| BPSK | Binary Phase Shift Keying |
| BWP | BandWidth Part |
| CAZAC | Constant Amplitude Zero Cross Correlation |
| CB | Code Block |
| CBG | Code Block Group |
| CDM | Code Division Multiplex |
| CM | Cubic Metric |
| CORESET | Control Resource Set |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DFTS-FDM | DFT-spread-FDM |
| DM(-)RS | Demodulation reference signal(ing) |
| eMBB | enhanced Mobile BroadBand |
| FDD | Frequency Division Duplex |
| FDE | Frequency Domain Equalisation |
| FDF | Frequency Domain Filtering |
| FDM | Frequency Division Multiplex |
| HARQ | Hybrid Automatic Repeat Request |
| IAB | Integrated Access and Backhaul |
| IFFT | Inverse Fast Fourier Transform |
| IR | Impulse Response |
| ISI | Inter Symbol Interference |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/ Multiple Access |
| PAPR | Peak to Average Power Ratio |
| PDCCH | Physical Downlink Control Channel |
| PDSCH | Physical Downlink Shared Channel |

-continued

| Abbreviation | Explanation |
|---|---|
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| PSS | Primary Synchronisation Signal(ing) |
| (P)SSCH | (Physical) Sidelink Shared Channel |
| QAM | Quadrature Amplitude Modulation |
| OCC | Orthogonal Cover Code |
| QPSK | Quadrature Phase Shift Keying |
| PSD | Power Spectral Density |
| RAN | Radio Access Network |
| RAT | Radio Access Technology |
| RB | Resource Block |
| RNTI | Radio Network Temporary Identifier |
| RRC | Radio Resource Control |
| RX | Receiver, Reception, Reception-related/side |
| SA | Scheduling Assignment |
| SC-FDE | Single Carrier Frequency Domain Equalisation |
| SC-FDM/A | Single Carrier Frequency Division Multiplex/ Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SSS | Secondary Synchronisation Signal(ing) |
| SVD | Singular-value decomposition |
| TB | Transport Block |
| TDD | Time Division Duplex |
| TDM | Time Division Multiplex |
| TX | Transmitter, Transmission, Transmission-related/side |
| UCI | Uplink Control Information |
| UE | User Equipment |
| URLLC | Ultra Low Latency High Reliability Communication |
| VL-MIMO | Very-large multiple-input-multiple-output |
| WD | Wireless device |
| ZF | Zero Forcing |
| ZP | Zero-Power, e.g., muted CSI-RS symbol |

Abbreviations may be considered to follow 3GPP usage if applicable.

The invention claimed is:

1. A method of operating a wireless device in a wireless communication network, the method comprising:
    transmitting feedback signaling including feedback information, the feedback information being encoded with an error coding scheme, an error coding size of the error coding scheme being dependent on a type of the feedback information and a priority of signaling associated with the feedback information.

2. The method according to claim 1, wherein the error coding scheme is at least one of based on and corresponds to a Cyclic Redundancy Check.

3. The method according to claim 1, wherein the feedback information is transmitted in a feedback report.

4. The method according to claim 1, wherein the feedback signaling comprises different types of feedback information, wherein to different types of feedback information, different error coding sizes may be associated.

5. The method according to claim 1, wherein the type of feedback information corresponds to one of, or a combination of, measurement information, acknowledgment information, and one or more subtypes thereof.

6. The method according to claim 1, wherein at least one of:
    the feedback signaling is physical layer signaling;
    the feedback information is physical layer information; and at least one of the feedback signaling and the feedback information represents Uplink Control Information, UCI.

7. The method according to claim 1, wherein the error coding size is 16 bits or more for a first type of information, and fewer than for the first type of feedback information for a second type of feedback information.

8. The method according to claim 1, wherein the type of feedback information corresponds to one of, or a combination of, different types of measurement information and different types of acknowledgement information.

9. The method according to claim 8, wherein the measurement information reports on at least one of signal strength and signal quality.

10. The method according to claim 8, wherein the acknowledgement information is associated to at least one of different types of scheduling, priority and quality of service.

11. The method according to claim 1, wherein the feedback signaling is transmitted in at least one of a beam selection and a beam switching procedure.

12. The method according to claim 1, wherein different types of feedback information correspond to different types of procedures in which the feedback signaling is transmitted.

13. A non-transitory computer storage medium storing a computer program comprising instructions causing processing circuitry to at least one of control and perform a method comprising:
transmitting feedback signaling including feedback information, the feedback information being encoded with an error coding scheme, an error coding size of the error coding scheme being dependent on a type of the feedback information and a priority of signaling associated with the feedback information.

14. A wireless device for a wireless communication network, the wireless device configured to:
transmit feedback signaling including feedback information, the feedback information being encoded with an error coding scheme, an error coding size of the error coding scheme being dependent on a type of the feedback information and a priority of signaling associated with the feedback information.

15. A method of operating a network node in a wireless communication network, the method comprising:
receiving, from a wireless device, feedback signaling including feedback information, the feedback information being encoded with an error coding scheme, an error coding size of the error coding scheme being dependent on a type of the feedback information and a priority of signaling associated with the feedback information.

16. The method according to claim 15, wherein the error coding scheme is at least one of based on and corresponds to a Cyclic Redundancy Check.

17. The method according to claim 15, wherein the feedback information is transmitted in a feedback report.

18. The method according to claim 15, wherein the feedback signaling comprises different types of feedback information, wherein to different types of feedback information, different error coding sizes may be associated.

19. The method according to claim 15, wherein the type of feedback information corresponds to one of, or a combination of, measurement information, acknowledgment information, and one or more subtypes thereof.

20. A network node for a wireless communication network, the network node configured to:
receive, from a wireless device, feedback signaling including feedback information, the feedback information being encoded with an error coding scheme, an error coding size of the error coding scheme being dependent on a type of the feedback information and a priority of signaling associated with the feedback information.

* * * * *